US008702511B2

(12) United States Patent
Dohta

(10) Patent No.: US 8,702,511 B2
(45) Date of Patent: Apr. 22, 2014

(54) COMPUTER READABLE STORAGE MEDIUM AND INFORMATION PROCESSING APPARATUS

(75) Inventor: Takuhiro Dohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1056 days.

(21) Appl. No.: 12/548,505

(22) Filed: Aug. 27, 2009

(65) Prior Publication Data

US 2010/0331091 A1  Dec. 30, 2010

(30) Foreign Application Priority Data

Jun. 24, 2009  (JP) ................................ 2009-150286

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC .................... 463/36; 463/31; 463/32; 463/33

(58) Field of Classification Search
USPC .............................................. 463/30–33, 36
See application file for complete search history.

(56) References Cited

U.S. PATENT DOCUMENTS

| 7,148,894 B1 | 12/2006 | Hayashi |
| 2004/0023717 A1* | 2/2004 | Tsuda et al. .................... 463/30 |
| 2006/0274068 A1 | 12/2006 | Barthelet |

FOREIGN PATENT DOCUMENTS

| EP | 1 569 172 | 8/2005 |
| JP | 11-306388 | 11/1999 |

OTHER PUBLICATIONS

Apr. 17, 2013 European Search Report for EP 09168570.1, 9 pages.
Weil, "The Synthesis of Cloth Objects", Computer Graphics USA, vol. 20, No. 4, Aug. 1986, pp. 49-54, 6 pages.
Watt et al., "Advanced Animation and Rendering Techniques", Jun. 1, 1992, Addison-Wesley, Workingham, England, pp. 418-420, 4 pages.

* cited by examiner

*Primary Examiner* — Kevin Y Kim
(74) *Attorney, Agent, or Firm* — Nixon & Vanderhye P.C.

(57) ABSTRACT

A CPU causes an object to make a predetermined motion, and calculates an attracting force or a repulsive force generated, in accordance with the predetermined motion, between a node of attention among a plurality of the nodes and at least one connected node connected to the node of attention. Further, the CPU calculates a maximum value and a minimum value, of each reference axis direction in a virtual space, of an attracting force or a repulsive force generated between the node of attention and the at least one connected node, calculates a modification vector using the calculated maximum value and minimum value of each reference axis direction, and controls the node of attention based on the calculated modification vector.

18 Claims, 36 Drawing Sheets

F I G. 17A
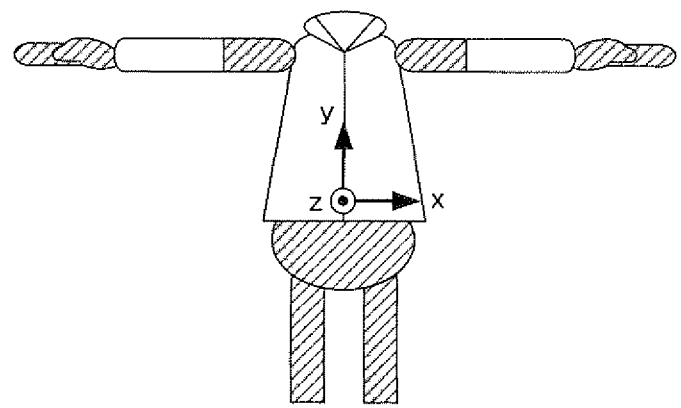
F I G. 17B
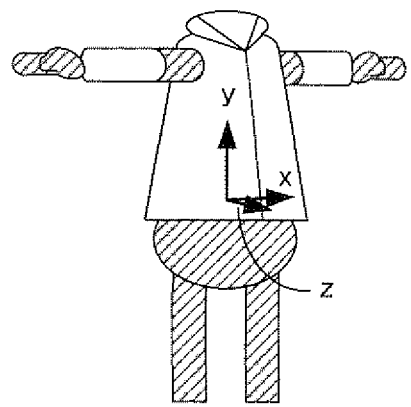
F I G. 17C
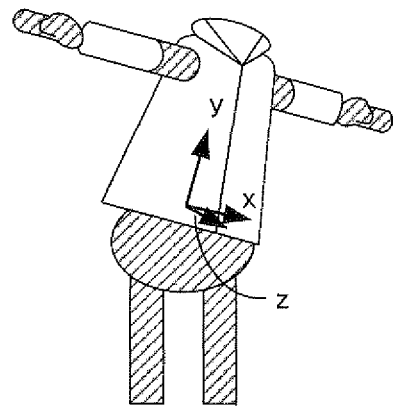

F I G. 4 0
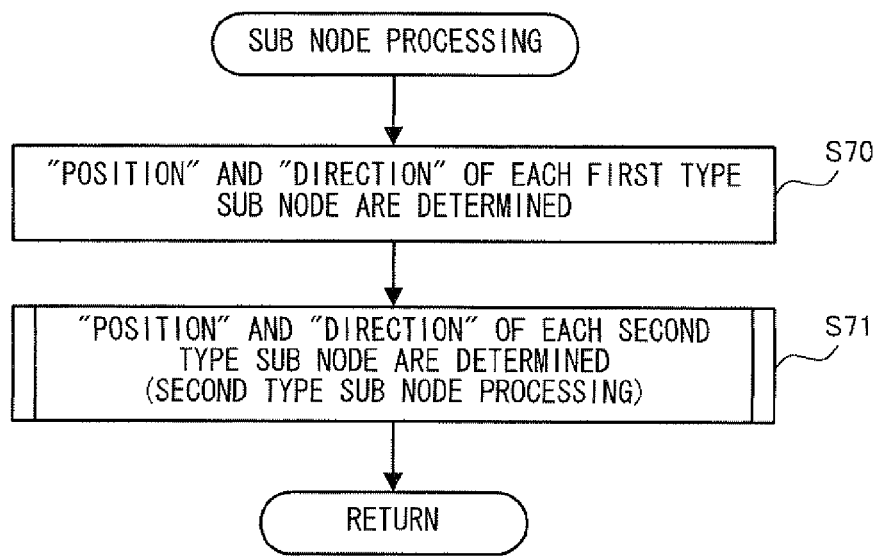

COMPUTER READABLE STORAGE MEDIUM AND INFORMATION PROCESSING APPARATUS

CROSS REFERENCE TO RELATED APPLICATION

The disclosure of Japanese Patent Application No. 2009-150286, filed on Jun. 24, 2009 is incorporated herein by reference.

BACKGROUND

1. Field

Example embodiments of the present invention relate to a computer readable storage medium and an information processing apparatus, and more specifically to a computer readable storage medium and a game processing apparatus for controlling a posture of an object in a virtual space.

2. Description of the Background Art

In Japanese Laid-OpenPatent Publication-No. 11-306388, the motion of a character is controlled using inverse kinematics (IK). In the case where the feet of the character are in contact with the game field, the feet are fixed to the contact positions, and the positions of the joints such as the knees are found by inverse kinematics.

According to inverse kinematics, the positions of distal sites (feet, hands, etc.) are first determined, and then the positions or directions of the joints acting as parents (knees, elbows, etc.) are determined in accordance with the positions of the distal sites. However, in order to make the posture of the character determined using inverse kinematics more natural, it is necessary to prepare, in advance, a great number of various parameters, such as the movable range of the joint and the like, and to perform complicated calculation processing.

SUMMARY

Therefore, example embodiments of the present invention provide a computer readable storage medium and an information processing apparatus capable of controlling the posture of an object formed of a plurality of nodes to be natural with a small amount of calculation.

Example embodiments of the present invention adopt the following structure.

A computer readable storage medium according to example embodiments of the present invention has an information processing program stored thereon executable by a computer of an information processing apparatus for executing information processing for displaying an object, formed of a plurality of nodes connected to each other in a virtual space, on a display device.

The information processing program causes the computer to function as object motion means; acting force calculation means; maximum and minimum calculation means; modification vector calculation means; node control means; and display control means.

The object motion means causes the object to make a predetermined motion.

The acting force calculation means calculates an attracting force or a repulsive force generated, in accordance with the predetermined motion, between a predetermined node (hereinafter, referred to as a "node of attention") among the plurality of nodes and each node (hereinafter, referred to as a "connected node") connected to the node of, attention.

The maximum and minimum calculation means calculates a maximum value and a minimum value of a component, of each reference axis direction, of the attracting force or the repulsive force generated between the node of attention and each connected node.

The modification vector calculation means calculates a modification vector using the maximum value and the minimum value of each reference axis direction calculated by the maximum and minimum calculation means.

The node control means controls the node of attention based on the modification vector calculated by the modification vector calculation means.

The display control means generates an image of the object which reflects the result of control by the node control means and displays the image on the display device.

The modification vector calculation means may include total value calculation means for calculating a total value of each reference axis direction of the maximum value and the minimum value which are calculated by the maximum and minimum calculation means for each reference axis direction. The modification vector calculation means may calculate the modification vector using the total value of each reference axis direction calculated by the total value calculation means.

The modification vector calculation means may use the total value of each reference axis direction calculated by the total value calculation means as a component of the modification vector of each reference axis direction.

The modification vector calculation means may include synthesized value calculation means for calculating a synthesized value of each reference axis direction, the synthesized value being calculated by multiplying, by a predetermined coefficient, the total value of the maximum value and the minimum value calculated by the maximum and minimum calculation means for each reference axis direction. The modification vector calculation means may calculate the modification vector using the synthesized value of each reference axis direction calculated by the synthesized value calculation means.

The modification vector calculation means may use the synthesized value of each reference axis direction calculated by the synthesized value calculation means as a component of the modification vector of each reference axis direction.

The acting force calculation means may include inter-node distance finding means for finding whether or not an inter-node distance between the node of attention and the connected node is equal to or greater than a predetermined distance. When the inter-node distance is found to be equal to or greater than the predetermined distance, the acting force calculation means may calculate an attracting force generated between the node of attention and the connected node in accordance with the predetermined motion.

The predetermined distance may be preset for each pair of nodes connected to each other.

The information processing program may cause the computer to further function as difference calculation means for calculating, for each of a plurality of preset pairs of nodes, a difference between the inter-node distance of the pair of nodes and the predetermined distance; difference total calculation means for calculating a total of the differences of all the pairs of nodes calculated by the difference calculation means; and difference upper limit finding means for finding whether or not the total of the differences of all the pairs of nodes calculated by the difference total calculation means has exceeded a predetermined value. While the difference upper limit finding means finds that the total of the differences of all the pairs of nodes has exceeded the predetermined value, the information processing program may cause the computer to execute a series of processing by the acting force calculation means, the maximum and minimum calculation means, the modification vector calculation means, and the node control means repeatedly. The display control means may generate an image of the object which reflects the result of repetition of the series of processing, and may display the image on the display device.

While the difference upper limit finding means find that the total of the differences of all the pairs of nodes has exceeded the predetermined value, the information processing program may cause the computer to execute the series of processing repeatedly with a predetermined upper limit number of times.

The information processing program may cause the computer to further function as node setting means for setting a predetermined node among the plurality of nodes as the node of attention and setting each node connected to the node of attention as the connected node. The information processing program may cause the computer to execute a series of processing by the node setting means, the acting force calculation means, the maximum and minimum calculation means, the modification vector calculation means, and the node control means repeatedly while sequentially changing the node of attention which is set by the node setting means. The display control means may generate an image of the object which reflects the result of repetition of the series of processing, and may display the image on the display device.

The object motion means may cause the object to make the predetermined motion by moving at least one node among the plurality of nodes.

The information processing program may be stored on any computer readable storage medium (e.g., flexible disc, hard disc, optical disc, magneto optical disc, CD-ROM, CD-R, magnetic tape, nonvolatile semiconductor memory card, RAM, etch.)

An information processing apparatus according to example embodiments of the present invention executes information processing for displaying an object, formed of a plurality of nodes connected to each other in a virtual space, on a display device. The information processing apparatus comprises object motion means for causing the object to make a predetermined motion; acting force calculation means for calculating an attracting force or a repulsive force generated, in accordance with the predetermined motion, between a predetermined node (hereinafter, referred to as a "node of attention") among the plurality of nodes and each node (hereinafter, referred to as a "connected node") connected to the node of attention; maximum and minimum calculation means for calculating a maximum value and a minimum value of a component, of each reference axis direction, of the attracting force or the repulsive force generated between the node of attention and each connected node; modification vector calculation means for calculating a modification vector using the maximum value and the minimum value of each reference axis direction calculated by the maximum and minimum calculation means; node control means for controlling the node of attention based on the modification vector calculated by the modification vector calculation means; and display control means for generating an image of the object which reflects the result of control by the node control means and displaying the image on the display device.

According to example embodiments of the present invention, the posture of an object formed of a plurality of nodes can be controlled to be natural with a small amount of calculation.

These and other features, aspects and effects of example embodiments of the present invention will become more apparent from the following detailed description of example embodiments of the present invention when taken in conjunction with the accompanying drawings.

BRIEF DESCRIPTION OF THE DRAWINGS

FIG. 17A shows how the posture of the character object chances;
FIG. 17B shows how the posture of the character object changes;
FIG. 17C shows how the posture of the character object changes.

FIG. 40 is a flowchart showing the details of sub node processing.

DESCRIPTION OF THE EXAMPLE EMBODIMENTS

Overall Structure of the Game System

Figure 1:
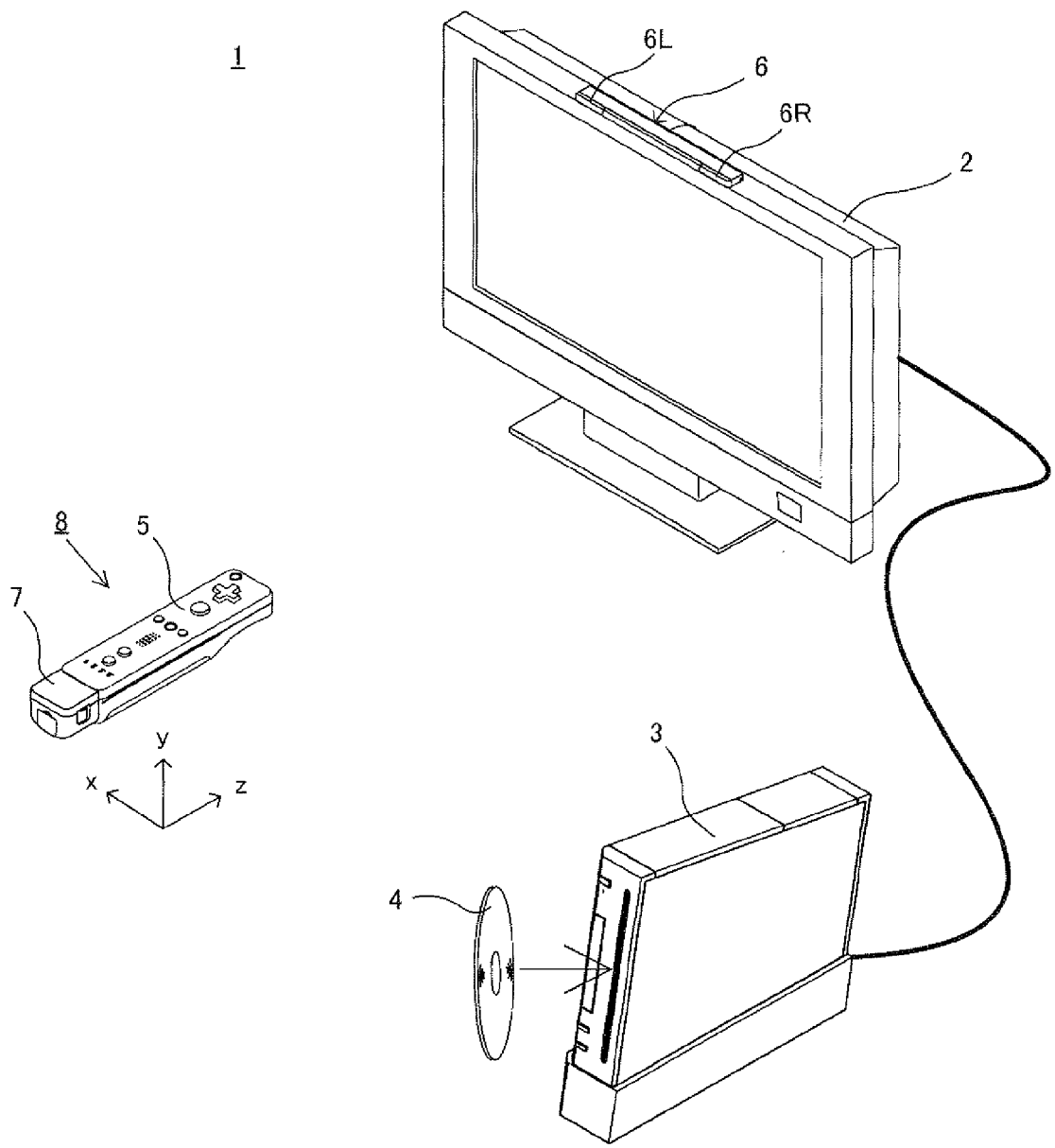
FIG. 1 is an external view of a game system.

With reference to FIG. 1, a game system 1 including a game apparatus according to one embodiment of the present invention will be described. FIG. 1 is an external view of the game system 1. Hereinafter, a game apparatus and a game program according to this embodiment will be described. In the following example, the game apparatus its of an installation type. As shown in FIG. 1, the game system 1 includes a television receiver 2 (hereinafter, referred to simply as the "TV") 2, a game apparatus 3, an optical disc 4, an input device 8, and a marker section 6. In the game system 1, game processing is executed by the game apparatus 3 based on a game operation performed using the input device 8.

In the game apparatus 3, the optical disc 4, which is an example of an information storage medium exchangeably usable for the game apparatus 3, is detachably inserted. The optical disc 4 has stored thereon a game program to be executed by the game apparatus 3. The game apparatus 3 has an insertion opening for inserting the optical disc 4 on a front surface thereof. The game apparatus 3 reads and executes the game program stored on the optical disc 4 inserted into the insertion opening, and thus performs the game processing.

The game apparatus 3 is connected to the TV 2, which is an example of a display device, via a connection cord. The TV 2 displays a game image obtained as a result of the game processing executed by the game apparatus 3. A marker section 6 is provided in the vicinity of a display screen of the TV 2 (above the display screen in FIG. 1). The marker section 6 includes two markers 6R and 6L respectively at two ends thereof. Specifically, the marker 6R (also the marker GL) includes one or more infrared LEDs, and outputs infrared light forward from the TV 2. The marker section 6 is connected to the game apparatus 3, and the game apparatus 3 can control each of the infrared LEDs of the marker section 6 to be lit up or out.

The Input device 8 provides the game apparatus 3 with operation data representing the particulars of the operation made thereon. In this embodiment, the input device 8 includes a controller 5 and a gyrosensor unit 7. As described later in detail, in the input device 2, the gyrosensor unit 7 is detachably connected to the controller 5. The controller 5 and the game apparatus 3 are connected with each other via wireless communication. In this embodiment, the controller 5 and the game apparatus 3 are wirelessly communicable to each other by, for example, the Bluetooth (registered trademark) technology. In other embodiments, the controller 5 and the game apparatus 3 may be connected with each other in a wired manner.

(Internal Structure of the Game Apparatus 3)

Figure 2:
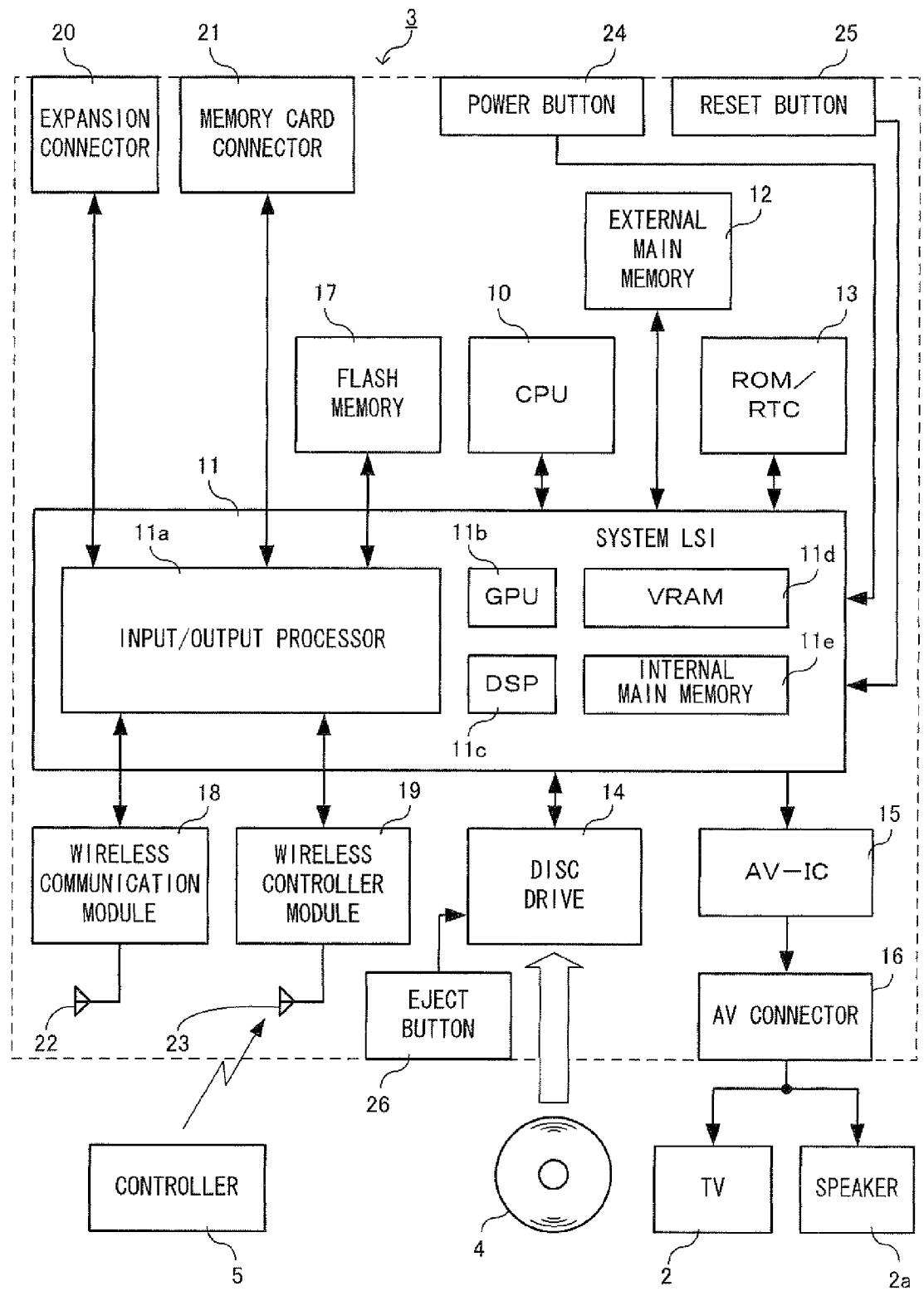
FIG. 2 is a block diagram of a game apparatus.

Next, with reference to FIG. 2, an internal structure of the game apparatus 3 will be described. FIG. 2 is a block diagram showing a structure of the game apparatus 3. The game apparatus 3 includes a CPU 10, a system LSI 11, an external main memory 12, a ROM/RTC 13, a disc drive 14, an AV-IC 15, and the like.

The CPU 10 performs the game processing by executing a game program stored on the optical disc 4, and acts as a game processor. The CPU 10 is connected to the system LSI 11. The system LSI 11 is connected to the CPU 10 and also to the external main memory 12, the ROM/RTC 13, the disc drive 14 and the AV-IC 15. The system LSI 11 performs the processing of, for example, controlling data transfer between the elements connected thereto, generating images to be displayed, and obtaining data from external devices. An internal structure of the system LSI 11 will be described later. The external main memory 12, which is of a volatile type, has stored thereon a program such as a game program read from the optical disc 4, a game program read from a flash memory 17 or the like, or various other data. The external main memory 12 is used as a work area or a buffer area of the CPU 10. The ROM/RTC 13 includes a ROM having a program for starting the game apparatus 3 incorporated thereon (so-called boot ROM) and a clock circuit for counting time (RTC: Real Time Clock). The disc drive 14 reads program data, texture data or the like from the optical disc 4 and writes the read data onto an internal main memory 11e described later or the external main memory 12.

The system LSI 11 includes an input/output processor (I/O processor) 11a, a GPU (Graphics Processor Unit) 11b, a DSP (Digital Signal Processor) 11c, a VRAM 11d, and the internal main memory 11e. Although not shown, these elements 11a through 11e are connected with each other via an internal bus.

The GPU 11b is a part of drawing means and generates an image in accordance with a graphics command (a command to draw an image) from the CPU 10. The VRAM 11d has stored thereon data necessary for the GPU 11b to execute the graphics command (polygon data, texture data or other data). The GPU 11*b* uses the data stored on the VRAM 11*d* to generate an image.

The DSP 11*c* acts as au audio processor and generates audio data using sound data or sound wave (sound tone) data stored on the internal main memory 11*e* or the external main memory 12.

The image data and the audio data generated as described above are read by the AV-IC 15. The AV-IC 15 outputs the read image data to the TV 2 via an AV connector 16, and outputs the read audio data to a speaker 2*a* built in the TV 2. Thus, the image is displayed on the TV 2 and also the sound is output from the speaker 2*a*.

The input/output processor 11*a* transmits or receives data to or from the elements connected thereto, or downloads data from external devices. The input/output processor 11*a* is connected to the flash memory 17, a wireless communication module 18, a wireless controller module 19, an expansion connector 20, and a memory card connector 21. The wireless communication module 18 is connected to an antenna 22, and the wireless controller module 19 is connected to an antenna 23.

The input/output processor 11*a* is connected to a network via the wireless communication module 18 and the antenna 22, and thus can communicate with other game apparatuses or various servers also connected to the network. The input/output processor 11*a* periodically accesses the flash memory 17, and detects whether or not there is data which needs to be transmitted to the network. When there is such data, the input/output processor 11*a* transmits such data to the network via the wireless communication module 18 and the antenna 22. The input/output processor 11*a* also receives data transmitted from other game apparatuses or data downloaded from a download server via the network, the antenna 22 and the wireless communication module 18, and stores the received data on the flash memory 17. The CPU 10 executes the game program and thus reads the data stored on the flash memory 17 to be used for the game program. The flash memory 17 may have stored thereon data saved as a result of playing the game using the game apparatus 3 (data representing a result or a state in the middle of the game) as well as the data to be transmitted to, or data received from, the other game apparatuses or various servers.

The input/output processor 11*a* receives operation data which is transmitted from the controller 5 via the antenna 23 and the wireless controller module 19 and stores (temporarily stores) the operation data in a buffer area of the internal main memory 11*e* or the external main memory 12.

The input/output processor 11*a* is connected to the expansion connector 20 and the memory card connector 21. The expansion connector 20 is a connector for an interface such as USB, SCSI or the like. The expansion connector 20 may be connected to a medium such as an external storage medium or the like, may be connected to a peripheral device such as another controller or the like, or may be connected to a wired communication connector, to communicate with the network instead of the wireless communication module 18. The memory card connector 21 is a connector for an external storage medium such as a memory card or the like. For example, the input/output processor 11*a* can access an external storage medium via the expansion connector 20 or the memory card connector 21 to store data on the external storage medium or read data from the external storage medium.

The game apparatus 3 has a power button 24, a reset button 25, and an eject button 26. The power button 24 and the reset button 25 are connected to the system LSI 11. When the power button 24 is turned on, the elements of the game apparatus 3 are provided with power via an AC adaptor (not shown). When the reset button 25 is pressed, the system LSI 11 restarts a starting program of the game apparatus 3. The eject button 26 is connected to the disc drive 14. When the eject button 26 is pressed, the optical disc 4 is dismounted from the disc drive 14.

(Structure of the Input Device 8)

Figure 3:
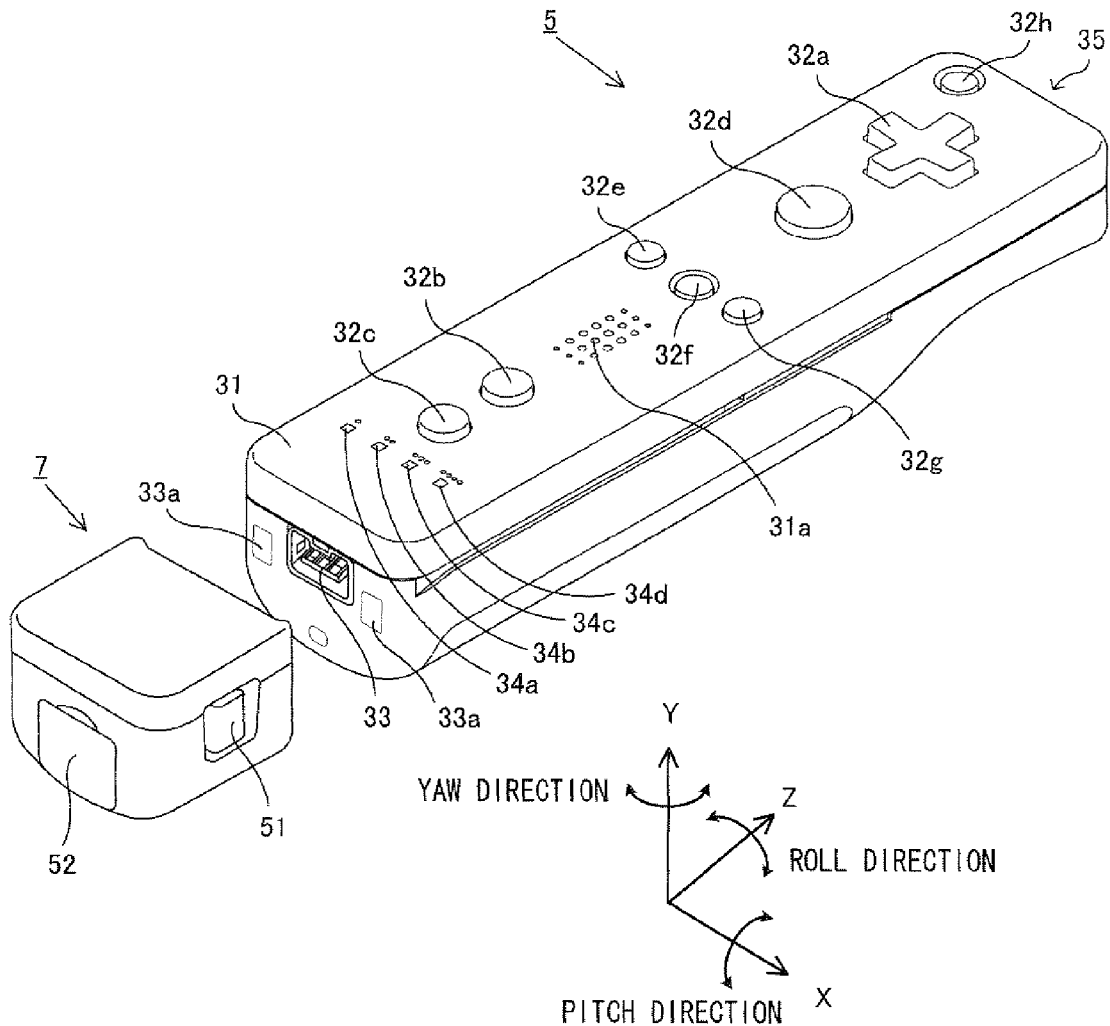
FIG. 3 is an Isometric view showing an external structure of an input device.
Figure 4:
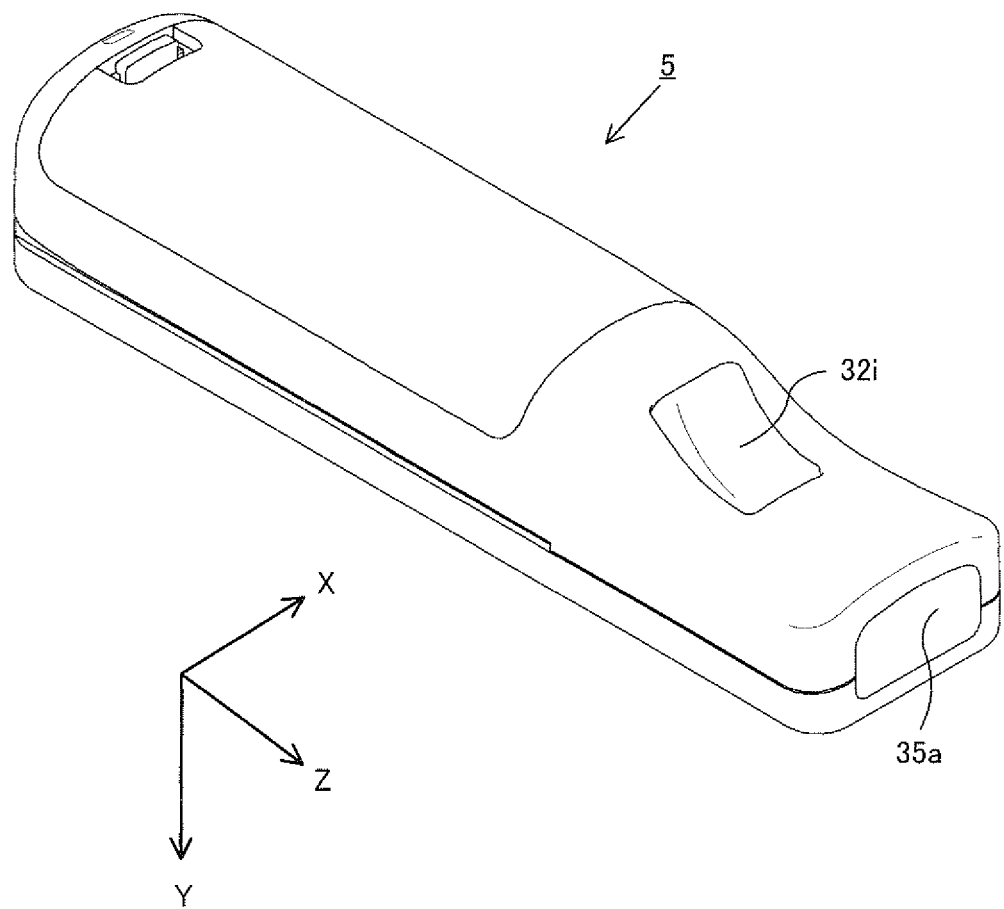
FIG. 4 is an isometric view showing an external structure of a controller.

With reference to FIG. 3 through FIG. 6, the input device 8 will be described. FIG. 3 is an isometric view showing an external structure of the input device 8. FIG. 4 is an isometric view showing an external structure of the controller 5. FIG. 3 is an isometric view of the input device 8 seen from the top rear side thereof. FIG. 4 is an isometric view of the controller 5 seen from the bottom front side thereof.

As shown in FIG. 3 and FIG. 4, the controller 5 includes a housing 31 formed by, for example, plastic molding. The housing 31 has a generally parallelepiped shape extending in a longitudinal or front-rear direction (Z-axis direction shown in FIG. 3). The overall size of the housing 31 is small enough to be held by one hand of an adult or even a child. A player can perform a game operation by, for example, pressing buttons provided in the controller 5 or moving the controllers itself to change the position or posture thereof.

The housing 31 has a plurality of operation buttons. As shown in FIG. 3, provided on a top surface of the housing 31 are a cross button 32*a*, a first button 32*b*, a second button 32*c*, an A button 32*d*, a minus button 32*e*, a home button 32*f*, a plus button 32*g*, and a power button 32*h*. As shown in FIG. 4, a recessed portion is formed on a bottom surface of the housing 31, and a B button 32*i* is provided on a slope surface of the recessed portion. The operation buttons 32*a* through 32*i* are assigned various functions in accordance with the game program executed by the game apparatus 3. The power button 32*h* is for remote-controlling the power of the main body of the game apparatus 3 to be on or off. The home button 32*f* and the power button 32*h* have a top surface thereof buried in the top surface of the housing 31, so as not to be inadvertently pressed by the player.

On a rear surface of the housing 31, a connector 33 is provided. The connector 33 is used for connecting the controller with another device (for example, the gyrosensor unit 7 or another controller). On both sides of the connector 33 on the rear surface of the housing 31, engagement holes 33*a* are provided for preventing such another device from easily coming off.

In a rear part of the top surface of the housing 31, a plurality of LEDs (in FIG. 3, four LEDs) 34*a* through 34*d* are provided. The controller 5 is assigned a controller type (number) so as to be distinguishable from other main controllers. The LEDs 34*a* through 34*d* are used for, for example, informing the player of the controller type which is currently set to the controller 5 that he/she is using, or for informing the player of the remaining battery amount. Specifically, when the controller 5 is used for the game operation, one of the plurality of LEDs 34*a* through 34*d* corresponding to the controller type is lit up.

Figure 7:
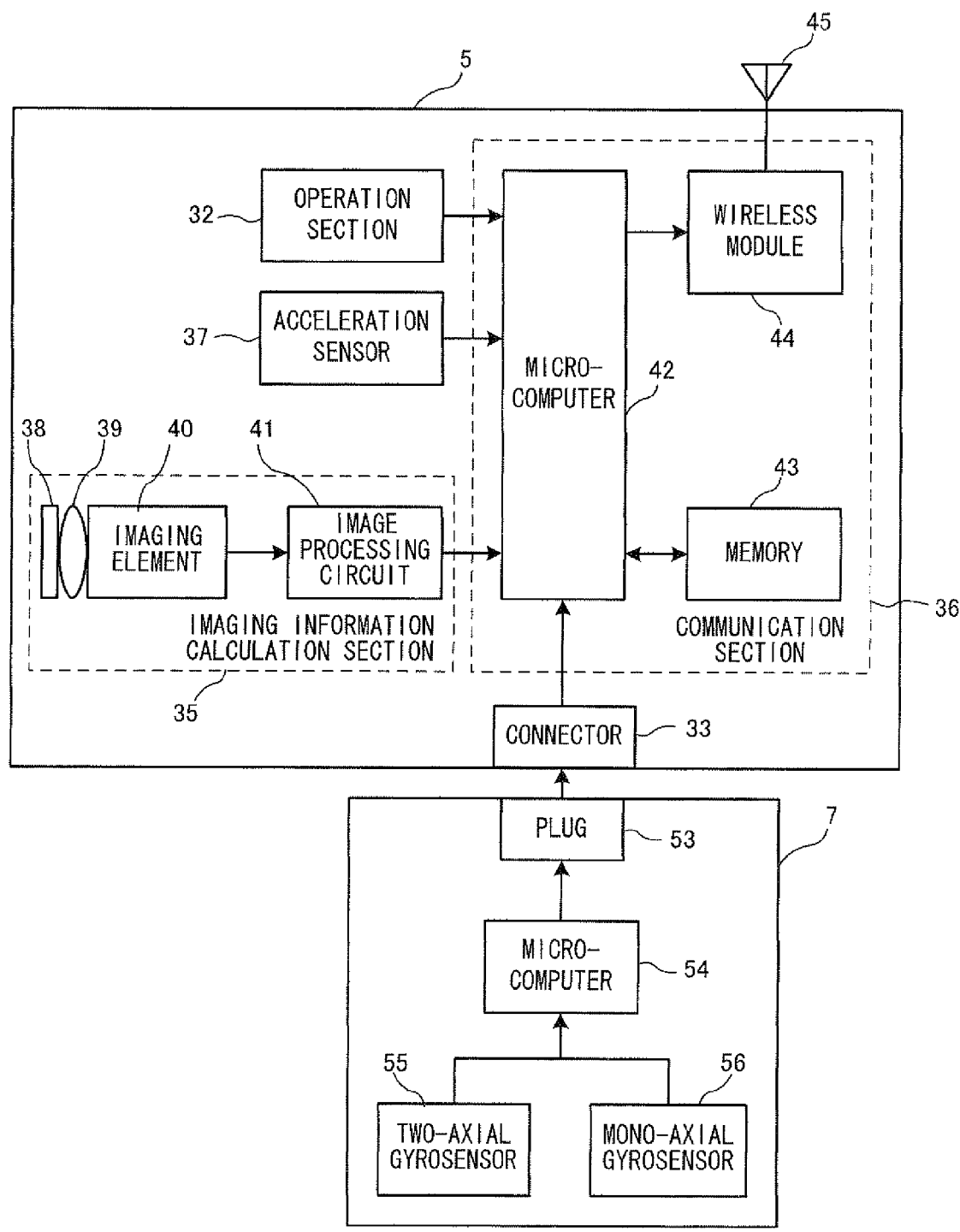
FIG. 7 is a block diagram showing a structure of the input device.

The controller 5 includes an imaging information calculation section 35 (FIG. 7). As shown in FIG. 4, a light incident face 35*a* of the imaging information calculation section 35 is provided on a front surface of the housing 31. The light incident face 35*a* is formed of a material which allows infrared light from the markers 6R and 6L to be at least transmitted therethrough.

On the top surface of the housing 31, sound holes 31*a* are formed between the first button 32*b* and the home button 32*f* for releasing the sound outside from a speaker 49 (FIG. 5) built in the controller 5.

Figure 5:
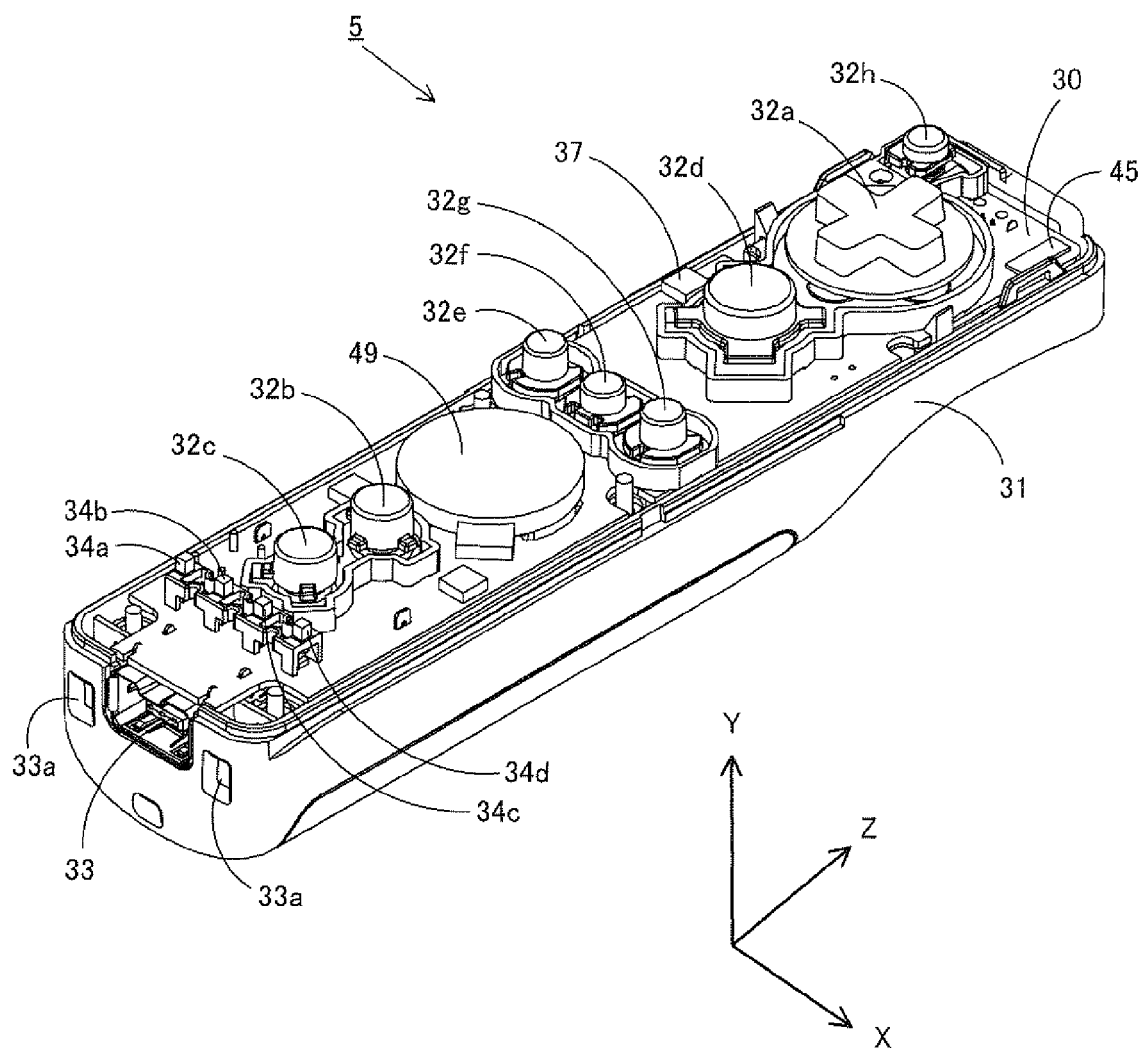
FIG. 5 is an isometric view showing an internal structure of the controller.
Figure 6:
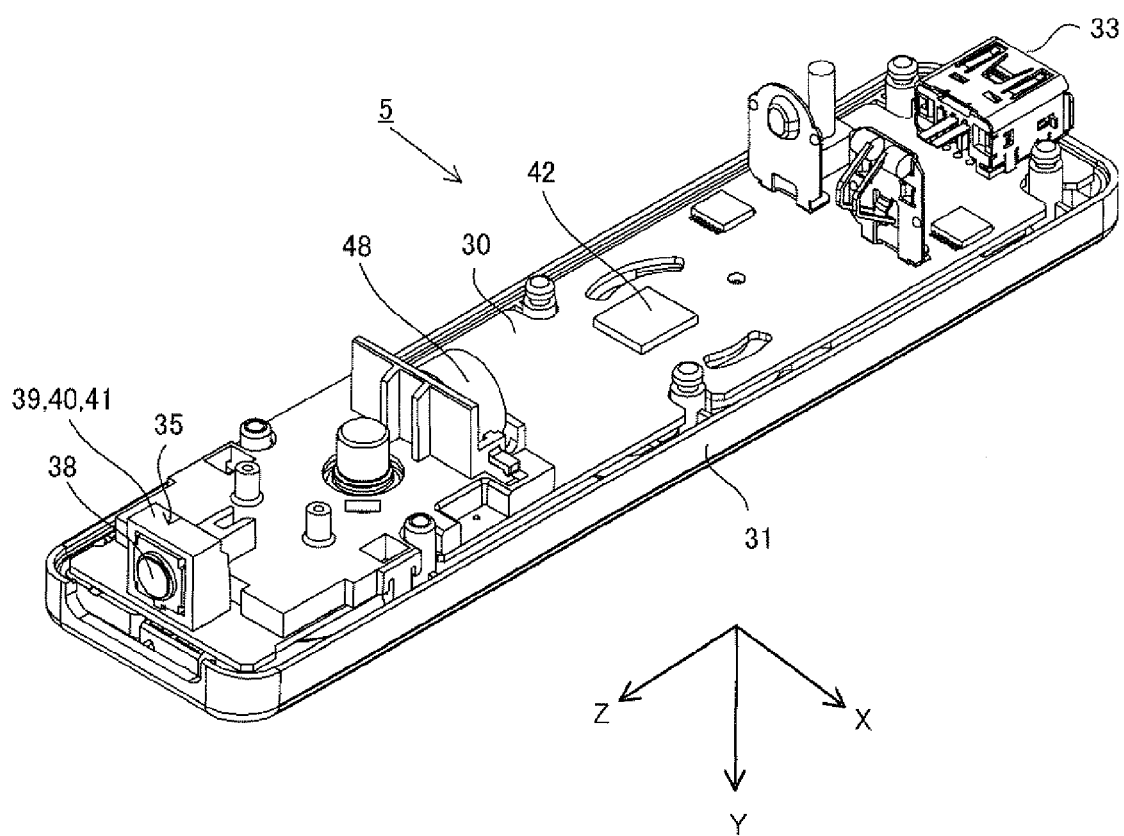
FIG. 6 is an isometric view showing an internal structure of the controller.

Now, with reference to FIG. 5 and FIG. 6, an internal structure of the controller 5 will be described. FIG. 5 and FIG. 6 illustrate an internal structure of the controller 5. FIG. 5 is an isometric view illustrating a state where an upper casing (a part of the housing 31) of the controller 5 is removed. FIG. 6 is an isometric view illustrating a state where a lower casing (a part of the housing 31) of the controller 5 is removed. FIG. 6 shows a reverse side of a substrate 30 shown in FIG. 5.

As shown in FIG. 5, the substrate 30 is fixed inside the housing 31. On a top main surface of the substrate 30, the operation buttons 32a through 32h, the LEDs 34a through 34d, an acceleration sensor 37, an antenna 45, the speaker 49 and the like are provided. These elements are connected to a microcomputer 42 (see FIG. 6) via lines (not shown) formed on the substrate 30 and the like. In this embodiment, the acceleration sensor 37 is provided off the center line of the controller 5 along an X-axis direction. This makes it easier to calculate the motion of the controller 5 when the controller 5 is rotated around the Z axis. The acceleration sensor 37 is also located forward with respect to the center of the controller 5 along the longitudinal direction thereof (Z-axis direction). The provision of a wireless module 44 (FIG. 7) and the antenna 45 allows the controller 5 to function as a wireless controller.

As shown in FIG. 6, at a front edge of a bottom main surface of the substrate 30, the imaging information calculation section 35 is provided. The imaging information calculation section 35 includes an infrared filter 38, a lens 39, an imaging element 40 and an image processing circuit 41 located in this order from the front surface of the controller 5. These elements 38 through 41 are attached to the bottom main surface of the substrate 30.

On the bottom main surface of the substrate 30, the microcomputer 42 and a vibrator 48 are provided. The vibrator 48 may be, for example, a vibration motor or a solenoid, and is connected to the microcomputer 42 via lines provided on the substrate 30 and the like. The controller 5 is vibrated by an actuation of the vibrator 48 based on an instruction from the microcomputer 42, and the vibration is conveyed to the hand of the player holding the controller 5. Thus, a so-called vibration-responsive game is realized. In this embodiment, the vibrator 48 is located slightly forward with respect to the center of the housing 31. Since the vibrator 48 is provided closer to a front end than the center of the controller 5, the vibration of the vibrator 48 can vibrate the entire controller 5 more significantly. The connector 33 is attached at a rear edge of the main bottom surface of the substrate 30. In addition to the elements shown in FIG. 5 and FIG. 6, the controller 5 includes a quartz oscillator for generating a reference clock of the microcomputer 42, an amplifier for outputting an audio signal to the speaker 49, and the like.

The gyrosensor unit 7 includes gyrosensors (gyrosensors 55 and 56 shown in FIG. 7) for sensing an angular velocity around three axes. The gyrosensor unit 7 is detachably attached on the connector 33 of the controller 5. At a front end of the gyrosensor unit 7 (an end thereof in a positive Z-axis direction shown in FIG. 3), a plug (a plug 53 shown in FIG. 7) connectable to the connector 33 is provided. On both sides of the plug 53, hooks (not shown) are provided. In the state where the gyrosensor unit 7 is attached to the controller 5, the plug 53 is connected to the connector 33 and the hooks are engaged with the engagement holes 33a of the controller 5. Thus, the controller 5 and the gyrosensor unit 7 are firmly secured to each other. The gyrosensor unit 7 also includes buttons 51 on side surfaces thereof (side surfaces perpendicular to the X-axis direction shown in FIG. 3). The buttons 51 are structured so as to release the hooks from the engagement holes 33a when being pressed. By pulling the plug 53 from the connector 33 while pressing the buttons 51, the gyrosensor unit 7 can be detached from the controller 5.

At a rear end of the gyrosensor unit 7, a connector having the same shape as that of the connector 33 is provided. Therefore, other devices attachable to the controller 5 (the connector 33 of the controller 5) can be attached to the connector of the gyrosensor unit 7. In FIG. 3, a cover 52 is detachably attached to the connector of the gyrosensor unit 7.

The shape of the controller 5 and the gyrosensor unit 7, the shape, number and position of the operation buttons, the acceleration sensor and the vibrator, and the like shown in FIG. 3 through FIG. 6 are merely exemplary, and may be different therefrom. In this embodiment, the imaging direction of the imaging means is the positive Z-axis direction, but the imaging direction may be any direction. Specifically, the position of the imaging information calculation section 35 (the light incident face 35a of the imaging information calculation section 35) in the controller 5 does not need to be on the front surface of the housing 31, and may be on another surface as long as light can enter from the outside of the housing 31.

FIG. 7 is a block diagram showing a structure of the input device 8 (the controller 5 and the gyrosensor unit 7). The controller 5 includes the operation section 32 (operation buttons 32a through 32i) the connector 33, the imaging information calculation section 35, a communication section 36, and the acceleration sensor 37. The controller 5 transmits operation data representing the particulars of the operation made thereon to the game apparatus 3 as operation data.

The operation section 32 includes the above-described operation buttons 32a through 32i, and outputs operation button data representing an input state of each of the operation buttons 32a through 32i (whether or not each of the operation buttons 32a through 32i has been pressed) to the microcomputer 42 of the communication section 36.

The imaging information calculation section 35 is a system for analyzing image data taken by the imaging means, distinguishing an area having a high brightness in the image data, and calculating the center of gravity, the size and the like of the area. The imaging information calculation section 35 has, for example, a maximum sampling cycle of about 200 frames/sec., and therefore can trace and analyze even a relatively fast motion of the controller 5

The imaging information calculation section 35 includes the infrared filter 38, the lens 39, the imaging element 40 and the image processing circuit 41. The infrared filter 38 allows only infrared light to pass therethrough, among light incident on the front surface of the controller 5. The lens 39 collects the infrared light which has been transmitted through the infrared filter 38 and causes the infrared light to be incident on the imaging element 40. The imaging element 40 is a solid-state imaging device such as, for example, a CMOS sensor or a COD sensor. The imaging element 40 receives the Infrared light collected by the lens 39 and outputs an image signal. The markers 6R and 6L of the marker section 6 located in the vicinity of the screen of the TV 2 each include an infrared ED for outputting infrared light forward from the TV 2. The provision of the infrared filter 38 allows the imaging element 40 to receive only the infrared light transmitted through the infrared filter 38 to generate image data. Therefore, the image of each of the markers 6R and 6L can be taken more accurately. Hereinafter, an image taken by the imaging element 40 will be referred to as a "taken image". The image data generated by the imaging element 40 is processed by the image processing circuit 41. The image processing circuit 41 calculates the positions of imaging targets (the markers 6R and 6L)

in the taken image. The image processing circuit 41 outputs a coordinate representing the calculated position to the microcomputer 42 of the communication section 36. The data on the coordinate is transmitted by the microcomputer 42 to the game apparatus 3 as operation data. Hereinafter, this coordinate will be referred to as a "marker coordinate". The marker coordinate changes in accordance with the direction (inclining angle) or the position of the controller 5 itself, and therefore the game apparatus 3 can calculate the direction or the position of the controller 5 using the marker coordinate.

In other embodiments, the controller 5 does not need to include the image processing circuit 41, and a taken image itself may be transmitted from the controller 5 to the game apparatus 3. In this case, the game apparatus 3 may include a circuit or program having substantially the same function as that of the image processing circuit 41 and calculate the marker coordinate.

The acceleration sensor 37 detects an acceleration (including a gravitational acceleration) of the controller 5. Namely, the acceleration sensor 37 detects a force (including the force of gravity) applied to the controller 5. The acceleration sensor 37 detects a value of the acceleration in a linear direction along a sensing axis (linear acceleration) among accelerations acting on a detection section of the acceleration sensor 37. For example, in the case of a multi-axial (at least two-axial) acceleration sensor, an acceleration component along each axis is detected as an acceleration acting on the detection section of the acceleration sensor. For example, a three-axial or two-axial-acceleration sensor may be of a type available from Analog Devices, Inc. or STMicroelectronics N.V. The acceleration sensor 37 is, for example, of an electrostatic capacitance type, but may be of any other system.

In this embodiment, the acceleration sensor 37 detects a linear acceleration in each of an up-down direction with respect to the controller 5 (Y-axis direction shown in FIG. 3), a left-right direction with respect to the controller 5 (X-axis direction shown in FIG. 3), and a front-rear direction with respect to the controller 5 (Z-axis direction shown in FIG. 3). Since the acceleration sensor 37 detects an acceleration in the linear direction along each axis, the output from the acceleration sensor 37 represents a value of the linear acceleration along each of the three axes. Namely, the detected acceleration is represented as a three-dimensional vector (ax, ay, az) in an XYZ coordinate system (controller coordinate system) which is set with respect to the input device (controller 5. Hereinafter, a vector having, as components, acceleration values along the three axes detected by the acceleration sensor 37 will be referred to as the "acceleration vector".

Data representing the acceleration detected by the acceleration sensor 37 (acceleration data) is output to the communication section 36. Since the acceleration detected by the acceleration sensor 37 changes in accordance with the direction (inclining angle) or the motion of the controller 5 itself, the game apparatus 3 can calculate the direction or the motion of the controller 5 using the acceleration data. In this embodiment, the game apparatus 3 finds the posture of the input device 8 (controller 5) based on the acceleration data and angular data described later. The posture of the input device 8 is represented by, for example, a coordinate value of an xyz coordinate system based on a predetermined position in a space in which the input device 8 is present. Here, as shown in FIG. 1, the xyz coordinate system has a premise that the input device 8 is located in front of the marker section 6. A direction from the position of the input device 8 toward the marker section 6 is a positive z-axis direction, a vertically upward direction (opposite to the gravitational direction) is a positive y-axis direction, and the leftward direction when the marker section 6 is seen from the position of the input device 8 is a positive x-axis direction. Herein, the posture of the input device 8, at which an X axis, a Y axis and a Z axis based on the input device 8 (controller 5) respectively match the x axis, the y axis and the z axis, is referred to as the "reference posture". The posture of the input device 8 is a posture in the xyz coordinate system in the case where the input device 8 is rotated from the reference posture in a roll direction (around the Z axis), a pitch direction (around the X axis) and a yaw direction (around the Y axis) with respect to the Z-axis direction.

Data (acceleration data) representing the acceleration detected by the acceleration sensor 37 (acceleration vector) is output to the communication section 36.

A computer such as a processor of the game apparatus 3 (for example, the CPU 10) or a processor of the controller 7 (for example, the microcomputer 42) executes processing based on an acceleration signal which is output from the acceleration sensor 37, and as a result, can estimate or calculate (determine) further information on the controller 5. A person of ordinary skill in the art would easily understand this from the description of this specification. For example, when the computer executes processing with a premise that the controller 5 including the acceleration sensor 37 is in a static state (i.e., when the computer executes processing with a premise that the acceleration detected by the acceleration sensor 37 includes only a gravitational acceleration), if the controller 5 is actually in a static state, it can be found based on the detected acceleration whether or not the posture of the controller 5 is inclined with respect to the direction of gravity, or how much the posture of the controller 5 is inclined with respect to the direction of gravity. Specifically, where the state in which a detection axis of the acceleration sensor 37 is directed vertically downward is a reference state, it can be found whether or not the controller 5 is inclined with respect to the reference state based on whether or not 1 G (gravitational acceleration) is applied to the controller 5. Based on the magnitude of the gravitational acceleration, it can also be found how much the controller 5 is inclined with respect to the reference state. In the case of a multi-axial acceleration sensor 37, it can be found more precisely how much the controller 5 is inclined with respect to the direction of gravity by processing a signal representing an acceleration along each axis. In this case, the processor may calculate the inclining angle of the controller 5 based on an output from the acceleration sensor 37, or may calculate the inclining direction of the controller 5 without calculating the inclining angle. By using the acceleration sensor 37 in combination with a processor in this manner, the inclining angle or posture of the controller 5 can be determined.

By contrast, with a premise that the controller 5 is in a dynamic state (in the state where the controller 5 is being moved), the acceleration sensor 37 detects an acceleration in accordance with the motion of the controller 5 in addition to the gravitational acceleration. Therefore, the moving direction of the controller 5 can be found by removing a component of the gravitational acceleration from the detected acceleration using predetermined processing. Even with the premise that the controller 5 is in a dynamic state, the inclination of the controller 5 with respect to the direction of gravity can be found by removing a component of the acceleration in accordance with the motion of the acceleration sensor from the detected acceleration using predetermined processing. In other embodiments, the acceleration sensor 37 may include an incorporated processing device or any other type of dedicated device for executing predetermined processing on an acceleration signal detected by built-in acceleration detection means before the detected acceleration signal is output to the microcomputer 42. In the case where the acceleration sensor 37 is used for, for example, detecting a static acceleration (for example, a gravitational acceleration), the incorporated or dedicated processing device may be of a type for converting the acceleration signal into an inclining angle (or any other preferable parameter).

The communication section 36 includes the microcomputer 42, a memory 43, the wireless module 44 and the antenna 45. The microcomputer 42 controls the wireless module 44 for wirelessly transmitting the data obtained by the microcomputer 42 to the game apparatus 3 while using the memory 43 as a storage area during processing. The microcomputer 42 is connected to the connector 33. Data transmitted from the gyrosensor unit 7 is input to the microcomputer 42 via the connector 33. Hereinafter, the gyrosensor unit 7 will be described.

The gyrosensor unit 7 includes the plug 53, a microcomputer 54, the two-axial gyrosensor 55 and the mono-axial gyrosensor 56. As described above, the gyrosensor unit 7 detects an angular velocity around three axes (in this embodiment, the X, Y and Z axes) and transmits data representing each detected angular velocity (angular velocity data) to the controller 5.

The two-axial gyrosensor 55 detects an angular velocity (per unit time) around the X axis and an angular velocity around the Y axis (per unit time). The mono-axial gyrosensor 56 detects an angular velocity around the Z axis (per unit time). In this specification, with respect to the imaging direction of the controller 5 (the positive Z-axis direction), the rotation directions around the Z, X and Y axes will be referred to as the "roll direction", the "pitch direction" and "yaw direction", respectively. Namely, the two-axial gyrosensor 55 detects the angular velocity in the pitch direction (rotation direction around the X axis) and the yaw direction (rotation direction around the Y axis), and the mono-axial gyrosensor 56 detects the angular velocity in the roll direction (rotation direction around the Z axis).

In this embodiment, the two-axial gyrosensor 55 and the mono-axial gyrosensor 56 are used in order to detect the angular velocity around the three axes. In other embodiments, the number and combination of the gyrosensors to be used are not specifically limited as long as the angular velocity around the three axes can be detected.

In this embodiment, the three axes around which the gyrosensors 55 and 56 detect the angular velocity are set to match the three axes along which the acceleration sensor 37 detects the acceleration (X, Y and Z axes). In other embodiments, the three axes around which the gyrosensors 55 and 56 detect the angular velocity do not need to match the three axes along which the acceleration sensor 37 detects the acceleration.

Data representing the angular velocity detected by each of the gyrosensors 55 and 56 is output to the microcomputer 54. Accordingly, data representing the angular velocity around the three axes, i.e., the X, Y and Z axes is input to the microcomputer 54. The microcomputer 54 transmits the data representing the angular velocity around the three axes as the angular velocity data to the controller 5 via the plug 53. The transmission from the microcomputer 54 to the controller 5 is performed at a predetermined cycle. Since game processing 15 generally performed at a cycle of 1/60 sec. (at a cycle of frame time), the transmission is preferably performed at a cycle of a time period equal to or shorter than 1/60 sec.

Now, the description of the controller 5 will be resumed. Data which is output from the operation section 32, the imaging information calculation section 35, and the acceleration sensor 37 to the microcomputer 42, and data transmitted from the gyrosensor unit 7 to the microcomputer 42, are temporarily stored on the memory 43. Such data is transmitted to the game apparatus 3 as the operation data. Namely, at the transmission timing to the wireless controller module 19 of the game apparatus 3, the microcomputer 42 outputs the operation data stored on the memory 43 to the wireless module 44. The wireless module 44 modulates a carrier wave of a predetermined frequency with the operation data and radiates the resultant very weak radio signal from the antenna 45, using, for example, the Bluetooth (registered trademark) technology. Namely, the operation data is modulated into a very weak radio signal by the wireless module 44 and transmitted from the controller 5. The very weak radio signal is received by the wireless controller module 19 on the side of the game apparatus 3. The received very weak radio signal is demodulated or decoded, and thus the game apparatus 3 can obtain the operation data. The CPU 10 of the game apparatus 3 executes the game processing based on the obtained operation data and the game program. The wireless communication from the communication section 36 to the wireless controller module 19 is performed at a predetermined cycle. Since game processing is generally performed at a cycle of 1/60 sec, (at a cycle of frame time), the wireless transmission is preferably performed at a cycle of a time period equal to or shorter than 1/60 sec. The communication section 36 of the controller 5 outputs each piece of the operation data to the wireless controller module 19 of the game apparatus 3 at a rate of, for example, once in 1/200 seconds.

By using the controller 5, the player can perform an operation of inclining the controller 5 at an arbitrary inclining angle, in addition to a conventional general game operation of pressing the operation buttons. With the controller 5 described above, the player can also perform an operation of indicating an arbitrary position on the screen by the controller 5 and also an operation of moving the controller 5 itself.

(Overview of the Game Processing)

Figure 8:
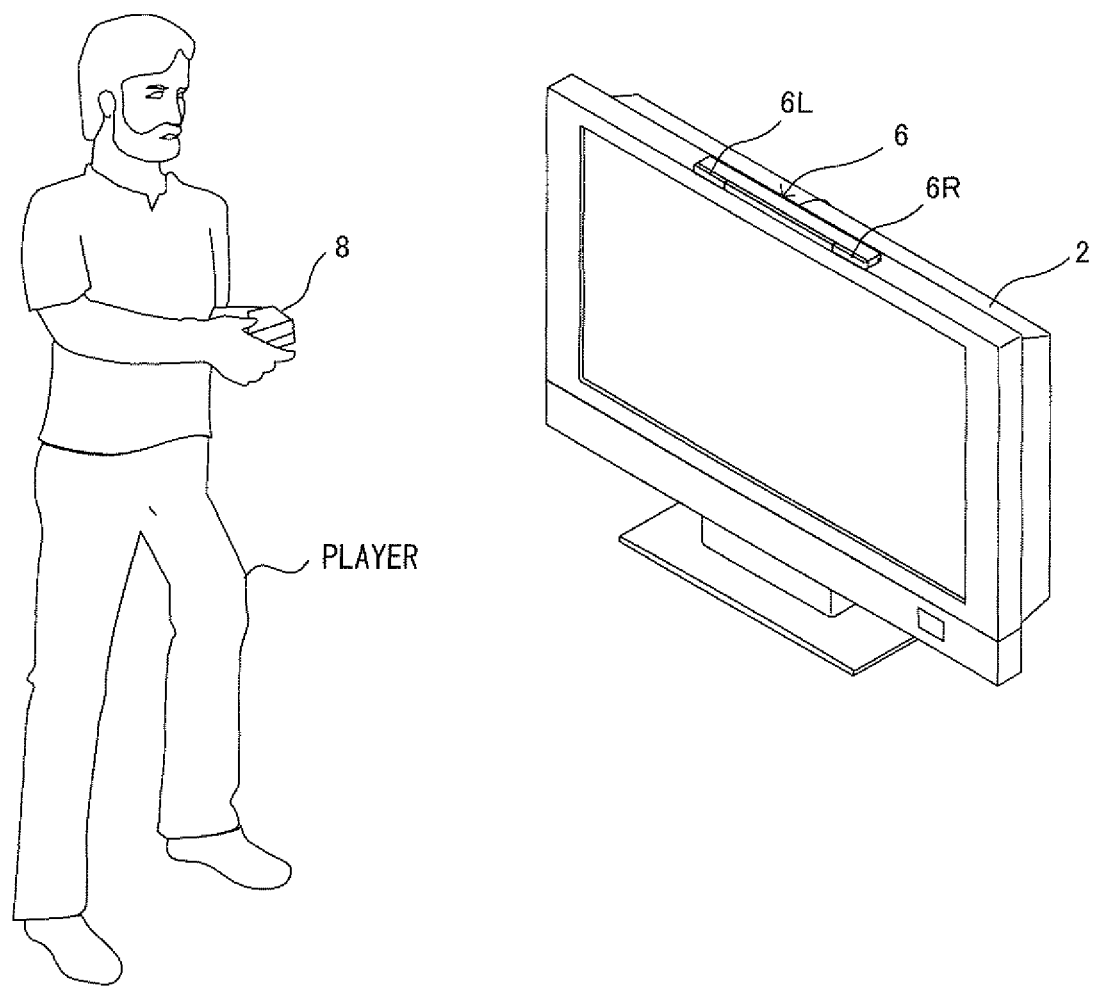
FIG. 8 generally shows a game operation which is made using the input device.

Now, an overview of a game played by the game system 1 will be described with reference respect to FIG. 8 and FIG. 10C.

Figure 9:
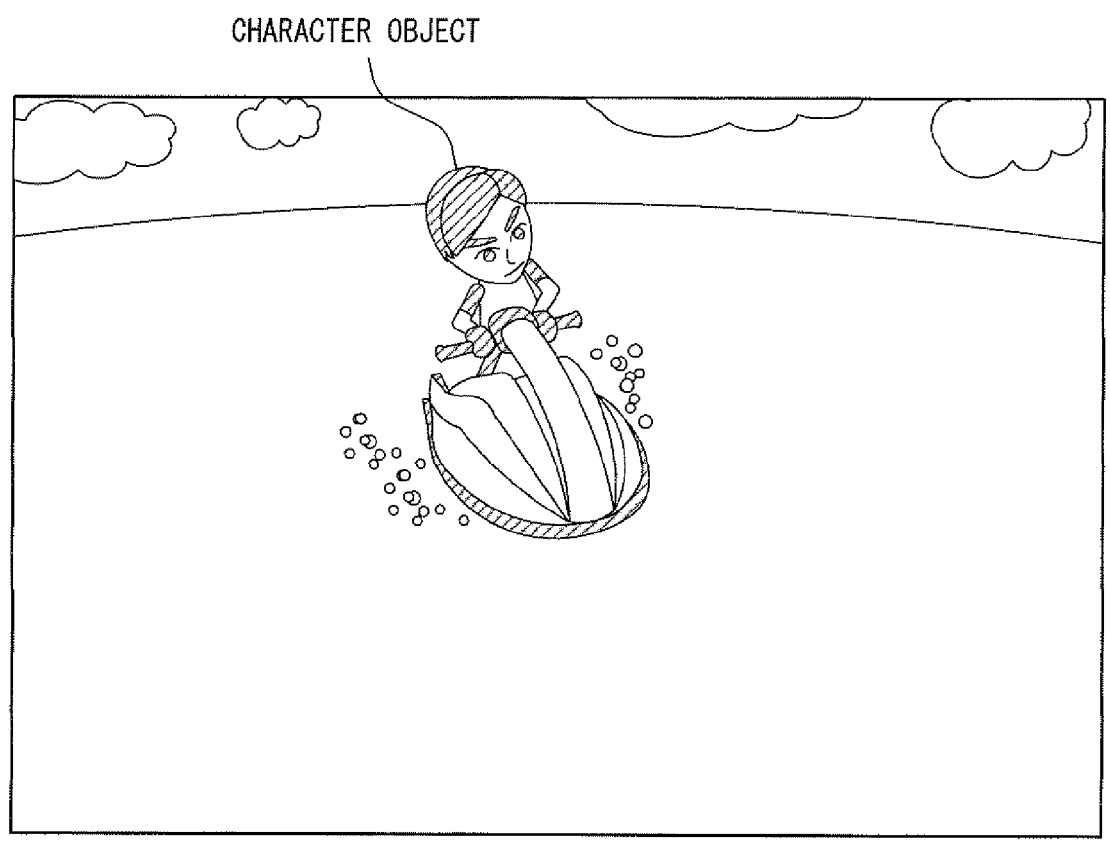
FIG. 9 shows an example of a game image displayed on the screen of the TV.

In the game played in this embodiment, a character object located in a virtual space maneuvers a jetski in accordance with an operation of a player. As shown in FIG. 8, the player holds the input device 8 with both hands and inclines the input device 8 right or left, and thus can control the advancing direction of the jetski. FIG. 9 shows an example of a game image displayed on the screen of the TV 2 during the execution of the game. On the screen of the TV 2, the character object as seen from a virtual camera located in the virtual space is displayed.

Figure 10A:
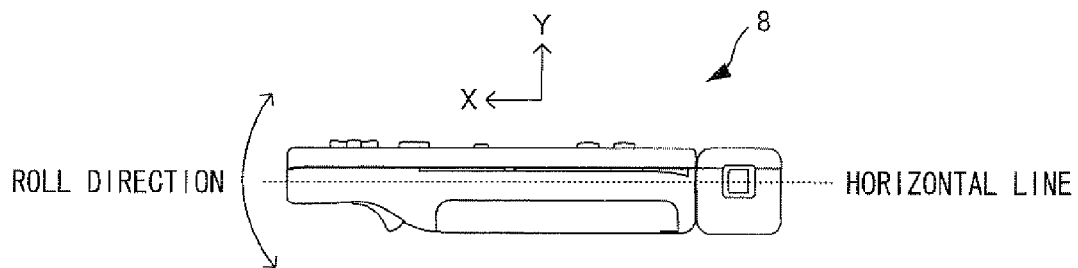
FIG. 10A shows an example of an operation method using the input device.
Figure 10B:
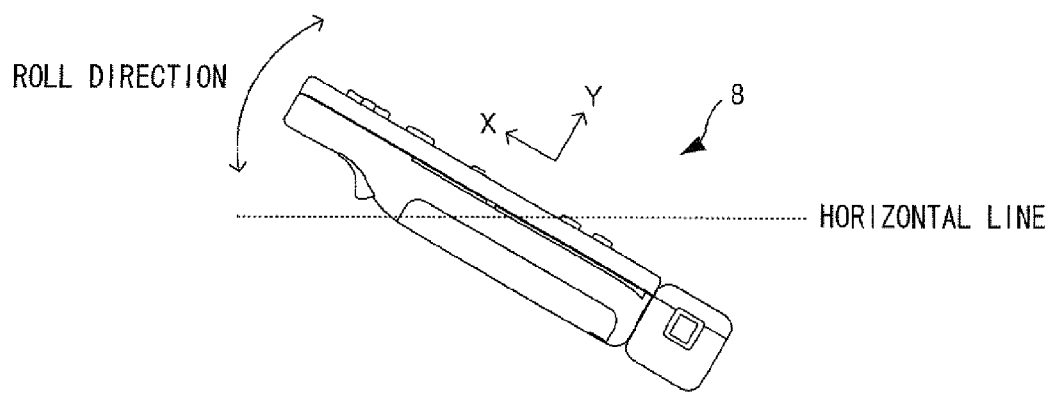
FIG. 10B shows an example of an operation method using the input device.
Figure 10C:
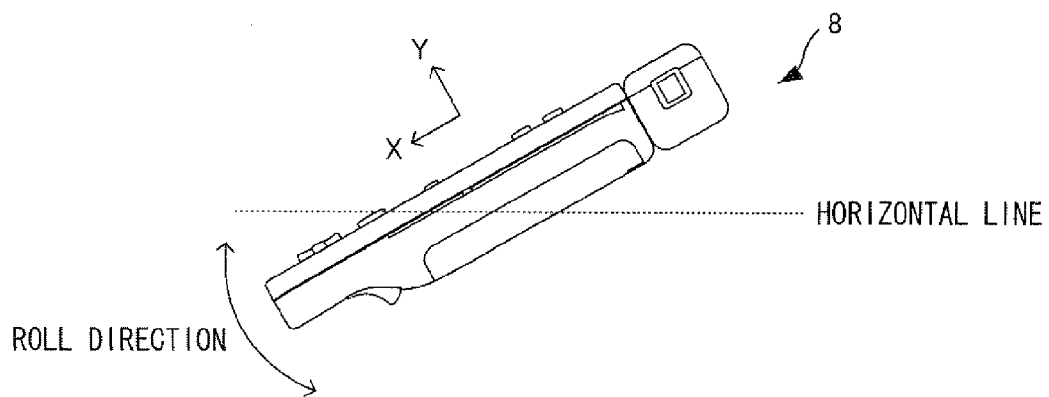
FIG. 10C shows an example of an operation method using the input device.

FIG. 10A through FIG. 10C show the input device 8 as seen in a horizontal direction from the player holding the input device 8 with both hands. In this embodiment, the advancing direction of the jetski is determined in accordance with, for example, the posture of the input device 8 in the roll direction. For example, as shown in FIG. 10A, in the case where a longitudinal direction of the input device 8 is horizontal, the jetski advances straight. As shown in FIG. 10B, in the case where the front end (the end at which the imaging information calculation section 35 is provided) of the input device 8 is at a higher position than the rear end (the end at which the gyrosensor unit 7 is provided), the jetski turns right. As shown in FIG. 10C, in the case where the front end of the input device 8 is at a lower position than the rear end, the jetski turns left. As described above, the posture of the input device 8 can also be calculated based on the angular velocity data which is output from the gyrosensor unit 7 or the acceleration data which is output from the acceleration sensor 37. In addition, the posture of the input device 8 can be calculated in consideration of both the angular velocity data which is output from the gyrosensor unit 7 and the acceleration data which is output from the acceleration sensor 37.

The posture of the character object in the virtual space changes variously in accordance with the situation of the game.

Figure 11A:
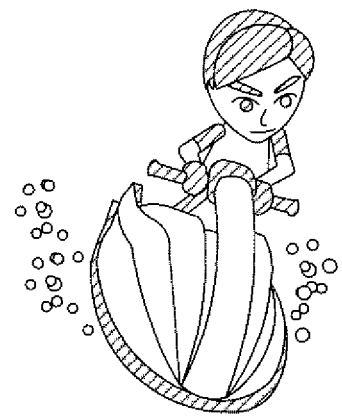
FIG. 11A shows an example of a posture of a character object.
Figure 11B:
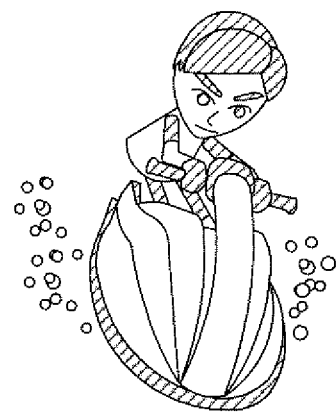
FIG. 11B shows an example of a posture of the character object.
Figure 11C:
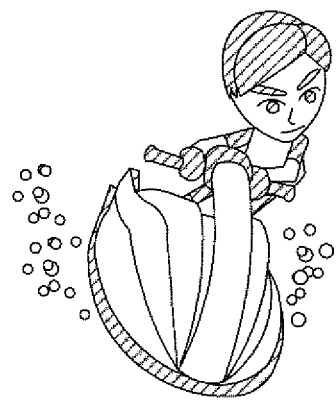
FIG. 11C shows an example of a posture of the character object.

For example, the position of the hips of the character object may be changed in accordance with the posture of the input device 8 in the roll direction. FIG. 11A shows the posture of the character object when the input device 8 is in the state of FIG. 10A. FIG. 11B shows the posture of the character object when the input device 8 is in the state of FIG. 10B. FIG. 11C shows the posture of the character object when the input device 8 is in the state of FIG. 10C. In FIG. 11A through FIG. 11C, both feet and both hands of the character object are fixed to the jetski, but the position of the hips moves in accordance with the posture of the input device 8.

Figure 12:
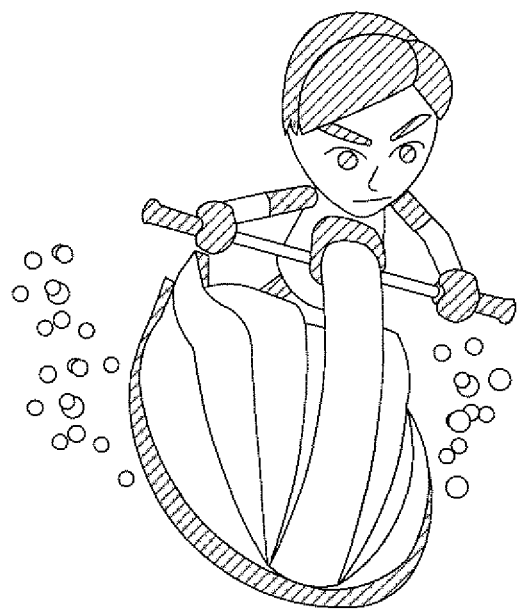
FIG. 12 shows an example of a posture of the character object.

Alternatively, the positions of both hands of the character object may be changed in accordance with the length of the handle of the jetski. For example, in FIG. 12, and handle is long as compared with the jetski, and so the distance between the hands of the character object is made longer.

Figure 13:
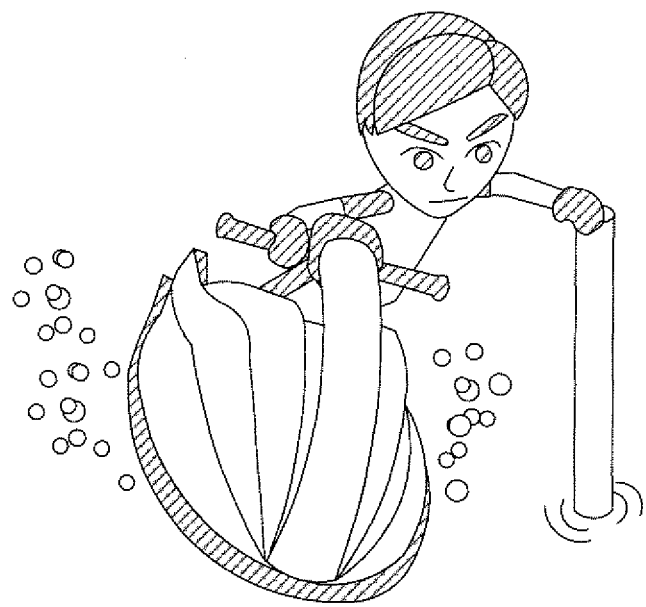
FIG. 13 shows an example of a posture of the character object.

Still alternatively, the left hand of the character object may be fixed to an object other than the handle of the jetski. For example, in FIG. 13, the left hand of the character object is fixed to a column protruding from the water surface.

In this embodiment, the posture of the character object as described above is controlled to be natural with a small amount of calculation. Hereinafter, an overview of the posture control of the character object in this embodiment will be described.

(Structure of the Character Object)

In this embodiment, the character object is defined as a joint structural body formed of a plurality of nodes. Herein, the term "node" means joints and also ends.

Figure 14:
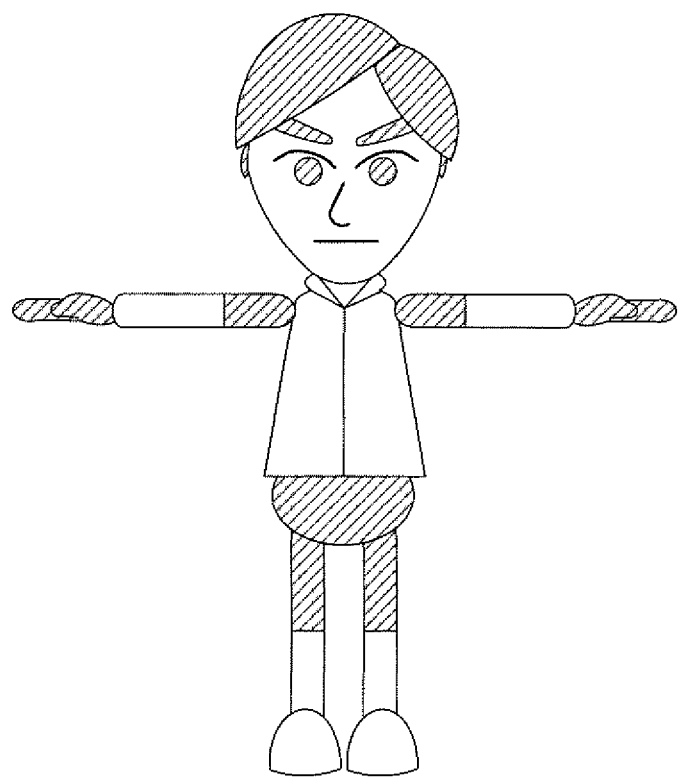
FIG. 14 shows an external appearance of the character object.
Figure 15:
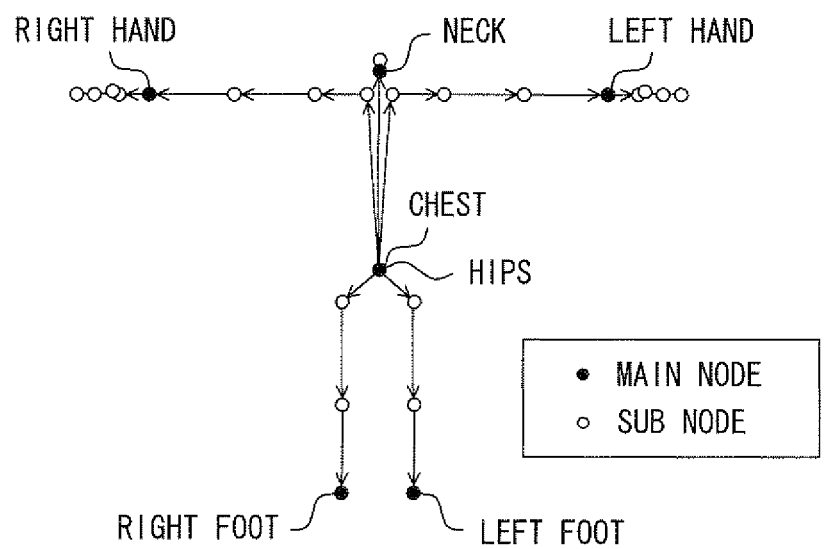
FIG. 15 shows a node structure of the character object.

FIG. 14 shows an external appearance of the character object. FIG. 15 shows a node structure corresponding to the character object shown in FIG. 14. In FIG. 15, white circles and black circles represent nodes forming the character object, and arrows connecting the nodes represent the hierarchical structure of the nodes. A node located at the starting point of an arrow is upper to the node located at the end point of the arrow. In this specification, a node located at the starting point of an arrow is called a "parent" (or "parent node") of the node located at the end point of the arrow. Conversely, a node located at the end point of an arrow is called a "child" (or "child node") of the node located at the starting point of the arrow.

In this embodiment, a plurality of nodes forming the character object are classified into main nodes and sub nodes. The positions and directions of the main nodes are determined first, and then the positions and directions of the sub nodes are determined by a different method from the main nodes. In this embodiment, for example, the seven nodes represented by the black circles in FIG. 15, namely, a right hand node, a neck node, a left hand node, a chest node, a hip node, a right foot node, and a left foot node of the character object are treated as the main nodes. The remaining nodes represented by the white circles (left finger node, left elbow node, left shoulder node, left groin node, left knee node, etc.) are treated as sub nodes. In this embodiment, the chest node and the hip node are defined as being at the same position, and so are displayed as overlapping in FIG. 15.

Figure 16A:
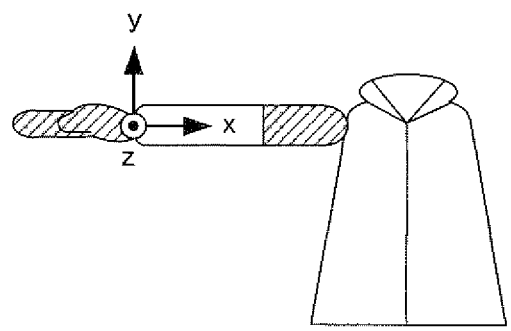
FIG. 16A shows how the posture of the character object changes.
Figure 16B:
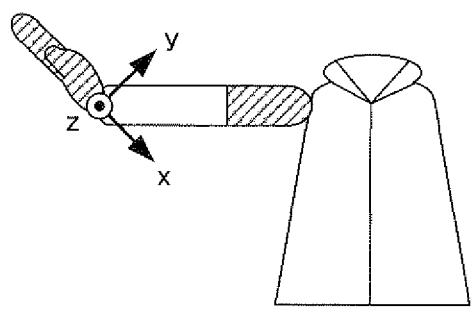
FIG. 16B shows how the posture of the character object changes.
Figure 16C:
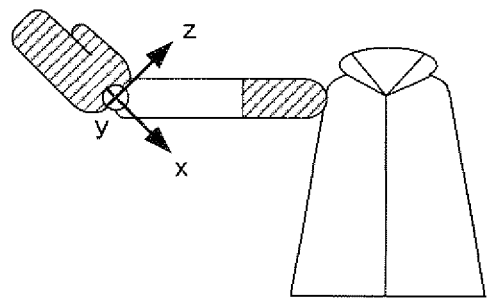
FIG. 16C shows how the posture of the character object changes.

FIG. 16A through FIG. 16C show a change of the posture of the character object when the direction of the right hand node of the character object is changed. In FIG. 16A through FIG. 16C, each arrow shows the direction of each of the x axis, the y axis and the z axis of the local coordinate system of the right hand node. When the direction of the right hand node (namely, the direction of the x axis, the y axis or the z axis of the local coordinate system of the right hand node in the virtual space) is changed, the posture of the right hand of the character object (namely, the end part of the character object from the right wrist) is changed. FIG. 17A through FIG. 17C show a change of the posture of the character object when the direction of the chest node of the character object is changed. In FIG. 17A through FIG. 17C, each arrow shows the direction of each of the x axis, the y axis and the z axis of the local coordinate system of the chest node. When the direction of the chest node (namely, the direction of the x axis, the y axis or the z axis of the local coordinate system of the chest node in the virtual space) is changed, the posture of the upper body of the character object (namely, the part of the character object upper to the hips) is changed. Namely, when a position or direction of a node is changed, this usually influences the position or direction of a node located on a lower stage to that node.

In order to change the position of the hips of the character object in accordance with the posture of the input device 8 in the state where both feet and both hands of the character object are fixed to a specific position of the jetski as shown in FIG. 11A through FIG. 11C, the following is performed in this embodiment. First, the position and direction of the left foot node, the position and direction of the right foot node, the position and direction of the left hand node, and the position and direction of the right hand node are each set to a predetermined value; and a value in accordance with the input device 8 is set for the position of the hip node. Based on these values and a predetermined "reference posture", the positions and directions of the remaining nodes are determined. Hereinafter, the "reference posture" will be described.

(Reference Posture)

Figure 18:
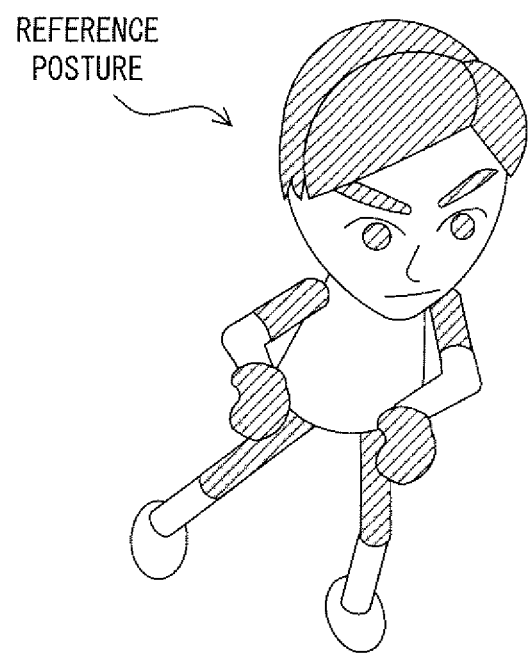
FIG. 18 shows an example of a reference posture (external appearance)
Figure 19:
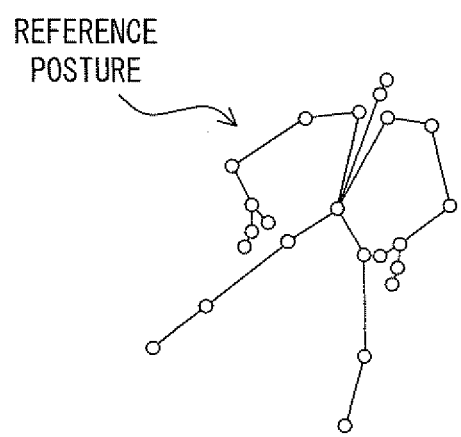
FIG. 19 shows an example of a reference posture (node structure)

FIG. 18 shows an example of the "reference posture" used for controlling the posture of the character object as shown in FIG. 11A through FIG. 13. The "reference posture" is specifically defined by the positions and directions of a plurality of nodes as shown in FIG. 19 (respectively corresponding to the plurality of nodes shown in FIG. 15). In this embodiment, as described later in more detail, when the positions and directions of a part of the nodes of the character object in the virtual space are set, the positions and directions of the remaining nodes are calculated based on the reference posture such that the posture of the character object as a whole in the virtual space appears close to the reference posture. Therefore, even though parameters of each joint such as the movable range of the like are not specifically set, the joints of the character object in the virtual space are not bent in an unnatural direction, and the posture of the character object appears natural.

Figure 20:
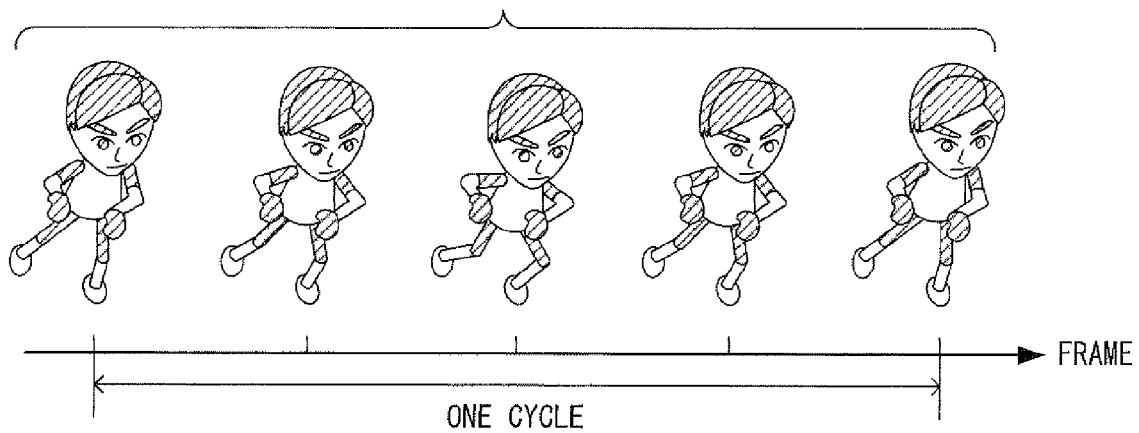
FIG. 20 shows an example of a reference posture changing along time.

The reference posture used for controlling the posture of the character object in the virtual space may be changed frame by frame. FIG. 20 shows an example in which the reference posture is changed along time. In this example, the reference posture is slightly changed frame by frame. With a period from when the character object stoops until the character object returns to the original posture being set as one cycle, the reference posture is periodically changed. When the posture of the character object is controlled using the reference posture as shown in FIG. 20, a game image in which the upper body of the character object on the jetski periodically sways up and down in the virtual space can be generated. For changing the reference posture as shown in FIG. 20, it is not necessary to prepare all the reference postures of all the frames. For example, only two reference postures may be prepared, and reference postures different from these reference postures may be generated in real time by interpolation or the liked based on the two reference postures.

Figure 21:
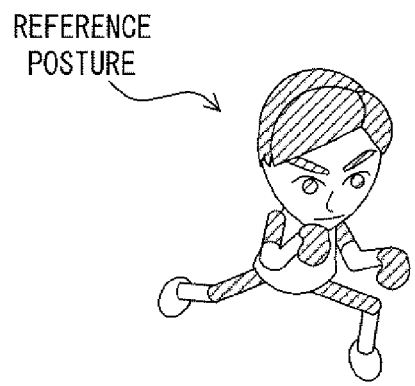
FIG. 21 shows another example of a reference posture.
Figure 22:
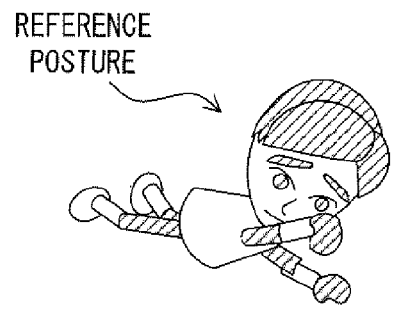
FIG. 22 shows still another example of a reference posture.

FIG. 21 and FIG. 22 show an example in which the reference posture is changed in accordance with the situation of the game. FIG. 21 shows an example of the reference posture used in the state where the character object is on standby before starting the jetski. FIG. 22 shows an example of the reference posture used in the state where the character object is about to be thrown out from the jetski.

(Control on the Positions and Directions of Main Nodes)

Figure 23:
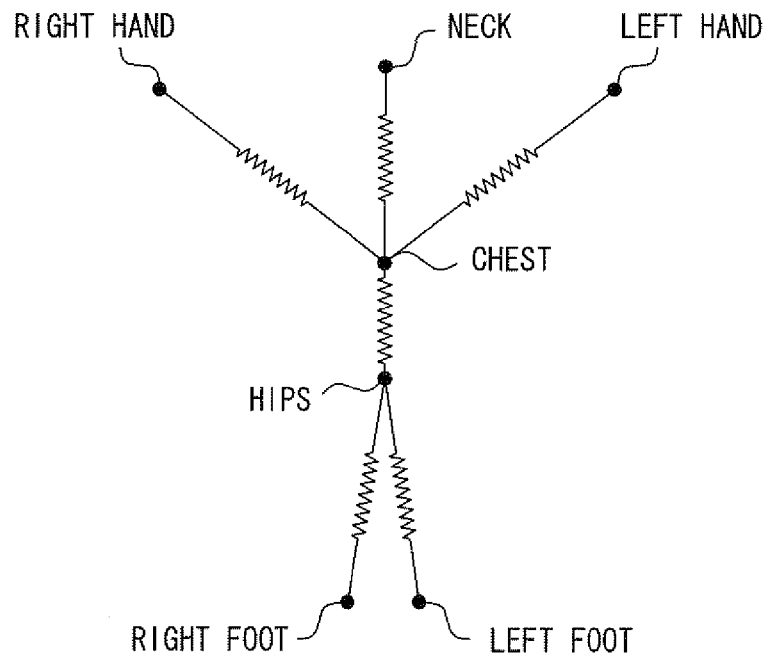
FIG. 23 shows springs provided between main nodes.

In this embodiment, when the positions and directions of a part of the main nodes of the character object in the virtual space are changed, the positions and directions of the remaining main nodes are changed in association therewith. For this purpose, six virtual springs as shown in FIG. 23 are introduced to be used for calculating the position and direction of each main node.

Each spring acts to make the relative position and the relative direction of one node (hereinafter, referred to as "node A") of two main nodes connected by the spring in the virtual space with respect to the other node (hereinafter, referred to as "node B") closer to the relative position and the relative direction of node A with respect to node B in the reference posture. (Hereinafter, the relative position of node A with respect to node B in the reference posture will be referred to as the "reference relative position of node A with respect to node B, and the relative direction of node A with respect to node B in the reference posture will be referred to as the "reference relative direction of node A with respect to node B".)

Figure 24:
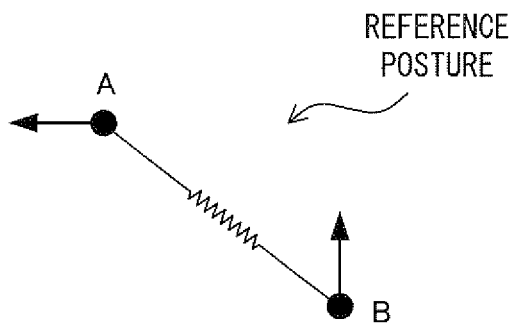
FIG. 24 shows an example of a reference posture.

FIG. 24 shows the positions and directions of node A and node B in the reference posture. In FIG. 24, the black circles each represent the position of the respective node, and the arrows each represent the direction of the respective node (e.g., the y axis of the local coordinate system, which represents the direction of the respective node).

Figure 25A:
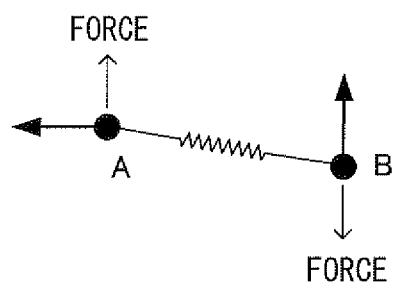
FIG. 25A shows a control method on main nodes.
Figure 25B:
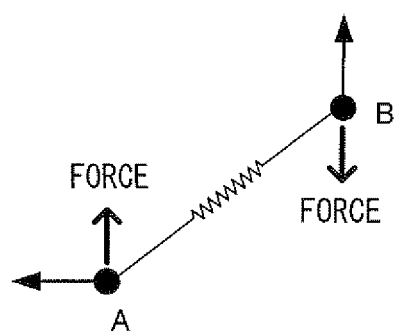
FIG. 25B shows a control method on main nodes.

In the case where the positions and directions of the node A and node B in the virtual space are as shown in FIG. 25A, the relative position of node A with respect to node B in the virtual space is deviated from the relative position of node A with respect to node B in the reference posture (reference relative position) shown in FIG. 24. Accordingly, the spring supplies node A and node B with opposite direction forces as shown in FIG. 25A so as to make the relative position of node A with respect to node B in the virtual space closer to the reference relative position. The forces supplied to the node A and node B by the spring increases in accordance with (e.g., in proportion to) the magnitude of the deviation between the relative position of node A with respect to node B in the virtual space and the relative position of node A with respect to node B in the reference posture (reference relative position). Accordingly, in the case where the positions and directions of the node A and node B in the virtual space are as shown in FIG. 25B, the spring supplies node A and node B with larger forces than in the case of FIG. 25A.

Figure 26A:
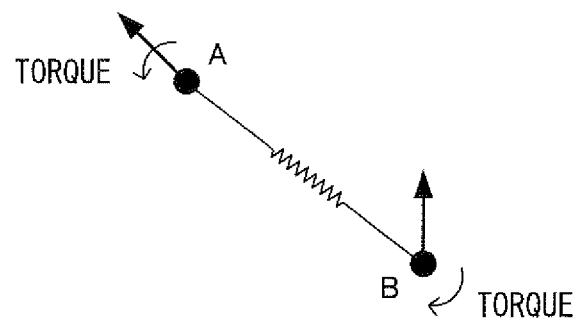
FIG. 26A shows a control method on main nodes.
Figure 26B:
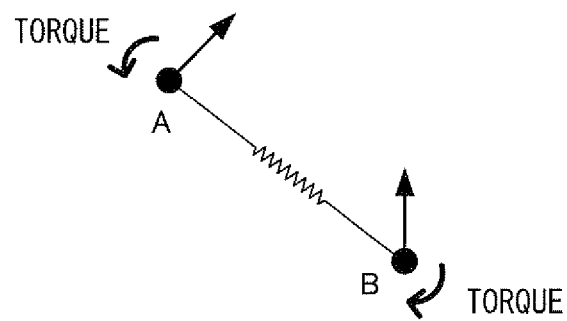
FIG. 26B shows a control method on main nodes.

In the case where the positions and directions of the node A and node B in the virtual space are as shown in FIG. 26A, the relative direction of node A with respect to node 3 in the virtual space is deviated from the relative direction of node A with respect to node B in the reference posture (reference relative direction) shown in FIG. 24. Accordingly, the spring supplies node A and node B with opposite direction torques as shown in FIG. 26A so as to make the relative direction of node A with respect to node B in the virtual space closer to the reference relative direction. The torques supplied to the node A and node B by the spring increases in accordance with (e.g., in proportion to) the magnitude of the deviation between the relative direction of node A with respect to node B in the virtual space and the relative direction of node A with respect to node B in the reference posture (reference relative direction). Accordingly, in the case where the positions and directions of the node A and node B in the virtual space are as shown in FIG. 26B, the spring supplies node A and node B with larger torques than in the case of FIG. 26A.

Figure 27:
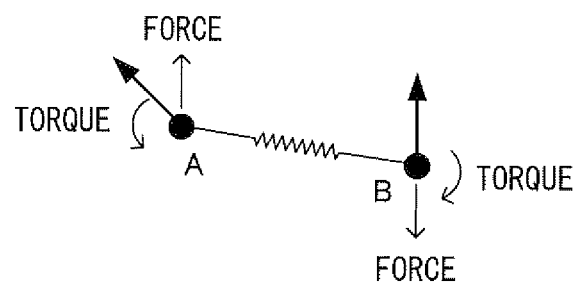
FIG. 27 shows a control method on main nodes.

In the case where the positions and directions of the node A and node B in the virtual space are as shown in FIG. 27, the relative position of node A with respect to node B in the virtual space is deviated from the relative position of node A with respect to node B in the reference posture (reference relative position) shown in FIG. 24. In addition, the relative direction of node A with respect to node B in the virtual space is deviated from the relative direction of node A with respect to node B in the reference posture (reference relative direction) shown in FIG. 24. Accordingly, the spring supplies node A and node B with opposite direction forces as shown in FIG. 27 so as to make the relative position of node A with respect to node B in the virtual space closer to the reference relative position, and also supplies node A and node B with opposite direction torques as shown in FIG. 27 so as to make the relative direction of node A with respect to node B in the virtual space closer to the reference relative direction.

When the force and torque to be supplied to each main node are calculated as described above, the position and direction of each main node in the virtual space are determined based on the force and torque.

When the position and direction of each main node in to the virtual space are determined, the position and direction of each main node is corrected when necessary. This correction processing will be described later.

(Control on the Positions and Directions of Sub Nodes)

When the position and direction of each main node in the virtual space are determined and confirmed, the positions and directions of the sub nodes are determined. The positions and directions of the sub nodes are uniquely determined based on the positions and directions of the main nodes already confirmed and the reference posture.

In this embodiment, the position and direction of each of a predefined part of the sub nodes (hereinafter, referred to as the "first type sub nodes") in the virtual space are uniquely determined based on the position and direction of one predefined specific node among at least one node connected to such a first type sub node (hereinafter, this one predefined specific node will be referred to as the "related node") in the virtual space and the reference posture. The position and direction of each of the remaining sub nodes (hereinafter, referred to as the "second type sub nodes") in the virtual space are uniquely determined based on the position and direction of two nodes connected to such a second type sub node (parent node and child node) in the virtual space and the reference posture.

Specifically, the position and direction of a first type sub node in the virtual space is determined such that the relative position and relative direction of the first type sub node with respect to the position and direction of the related node in the virtual space matches the relative position (reference relative position) and relative direction (reference relative direction) of the first type sub node with respect to the position and direction of the related node in the reference posture. For example, the position and direction of the left finger node in the virtual space is determined such that the relative position and relative direction of the left finger node with respect to the position and direction of the left hand node (parent node of the left finger node) in the virtual space matches the relative position (reference relative position) and relative direction (reference relative direction) of the left finger node with respect to the position and direction of the left hand node in the reference posture. For example, the position and direction of the left groin node in the virtual space is determined such that the relative position and relative direction of the left groin node with respect to the position and direction of the hip node (parent node of the left groin node) in the virtual space matches the relative position (reference relative position) and relative direction (reference relative direction) of the left groin node with respect to the position and direction of the hip node in the reference posture. In the above, the position and direction of a first type sub node are determined based on the position and direction of the parent node in the virtual space and the reference posture. Alternatively, the position and direction of a first type sub node may be determined based on the position and direction of the child node.

Now, with reference to FIG. 28 through FIG. 29D, a method for determining the position and direction of a second type sub node in the virtual space will be described. As a specific example, a method for determining the position and direction of the right knee node will be described.

Figure 28:
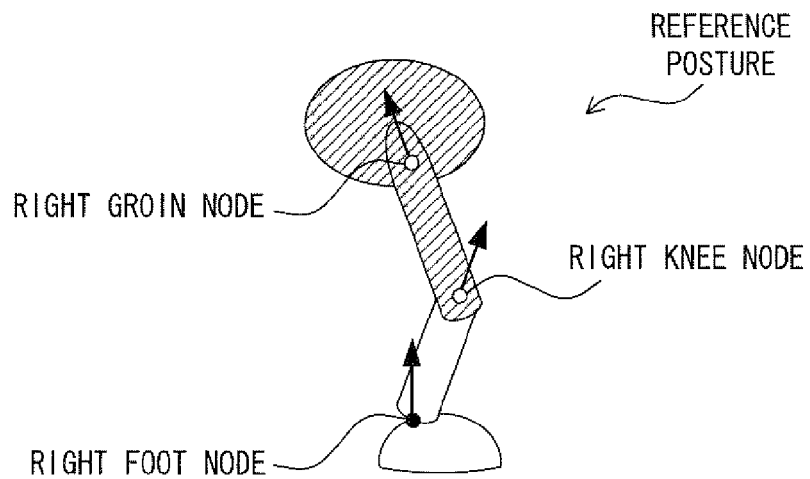
FIG. 28 shows an example of a reference posture.

FIG. 28 shows a reference posture of the character object. In FIG. 28, white circles and black circles each represent the position of each node, and arrows each represent the direction of each node (e.g., the y axis of the local coordinate system, which represents the direction of each node)*

The left foot node is a main node, and the right groin node is a first type sub node. In this embodiment, after the positions and directions of the main nodes and the first type sub nodes are all determined, the positions and directions of the second type sub nodes are determined. Accordingly, it is assumed that the position and direction of the left foot node and the position and direction of the left groin node have already been determined.

Figure 29A:
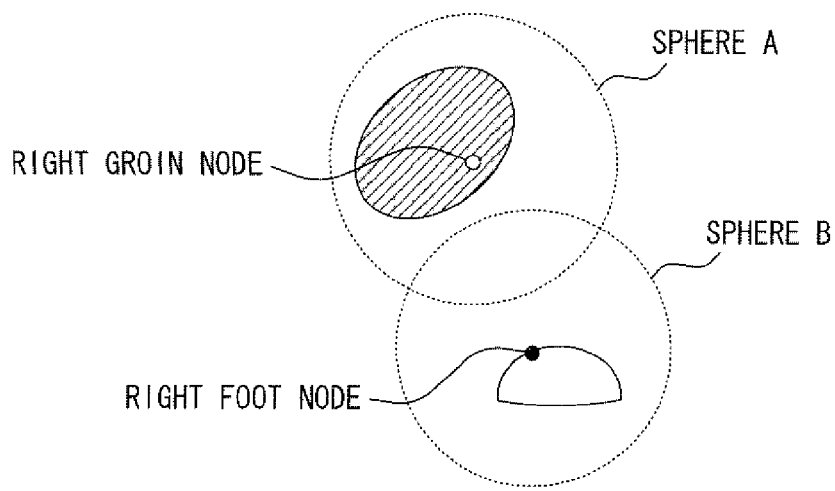
FIG. 29A shows a control method on a sub node.
Figure 29B:
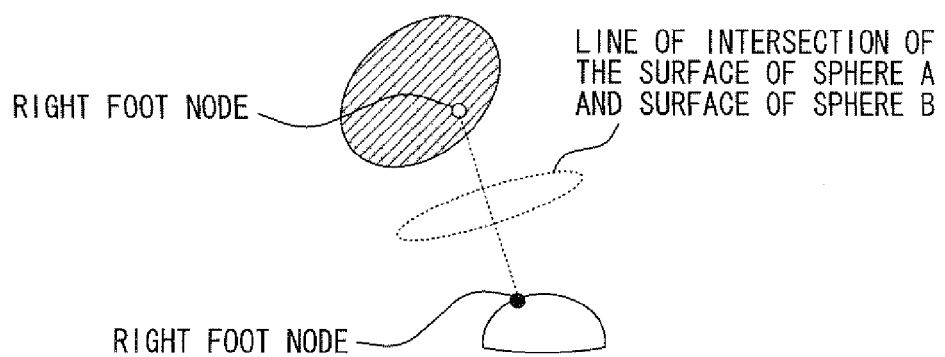
FIG. 29B shows a control method on a sub node.

First, in order to determine the position of the right knee node in the virtual space, as shown in FIG. 29A, sphere A centering around the right groin node in the virtual space and sphere B centering around the right foot node in the virtual space are found. The radius of sphere A is set to be equal to the distance between the right groin node and the right knee node in the reference posture. Namely, the surface of sphere A represents a candidate position of the right knee node based on the right groin node. The radius of sphere B is set to be equal to the distance between the right foot node and the right knee node in the reference posture. Namely, the surface of sphere B represents a candidate position of the right knee node based on the right foot node.

Figure 29C:
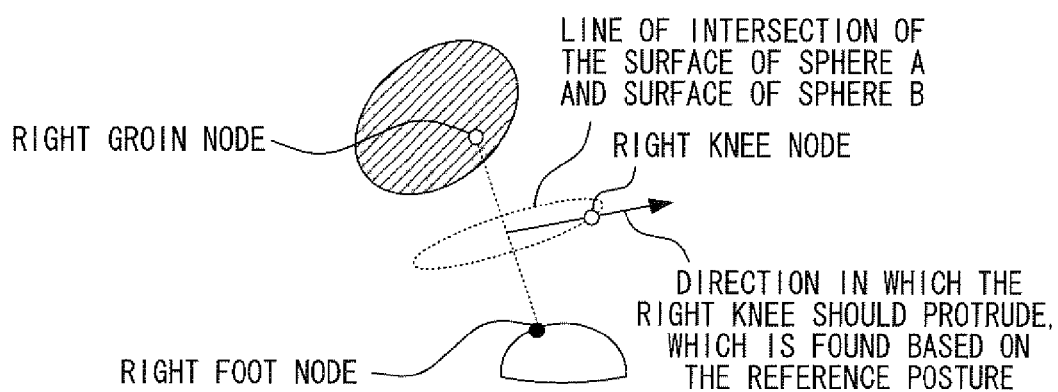
FIG. 29C shows a control method on a sub node.

When sphere A and sphere B are set as described above, as shown in FIG. 29B, points on the line of intersection of the surface of sphere A and the surface of sphere B are candidate positions for the right knee node in the virtual space. On this stage, there are a plurality of (an infinite number of) candidate positions for the right knee. Therefore, in this embodiment, by referring to the reference posture, the position of the right knee is uniquely determined from the plurality of candidate positions. Specifically, by referring to the reference posture data, in which direction the right knee should protrude from the straight line connecting the right groin node and the right foot node is determined. When the direction in which the right knee should protrude is determined, as shown in FIG. 29C, one point, on the line of intersection of the surface of sphere A and the surface of sphere B, which is located in the direction in which right knee should protrude from the straight line connecting the right groin node and the right foot node is determined as the position of the right knee node.

Figure 29D:
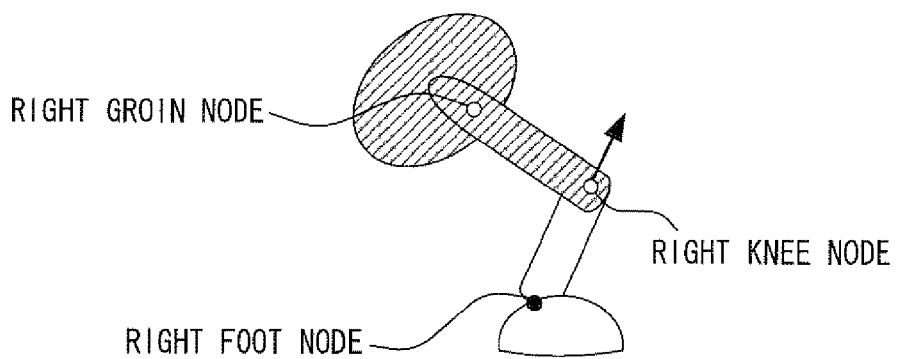
FIG. 29D shows a control method on a sub node.

When the position of the right knee node is determined, the direction of the right knee node is appropriately determined based on, for example, the positional relationship between the right knee node and the right foot node in the virtual space (FIG. 29D). This method for determining the position and direction of a second type sub node described above is merely exemplary.

(Details of the Game Processing)

Now, the details of the game processing executed by the CPU 10 based on the game program stored on the optical disc 4 will be described.

Figure 30:
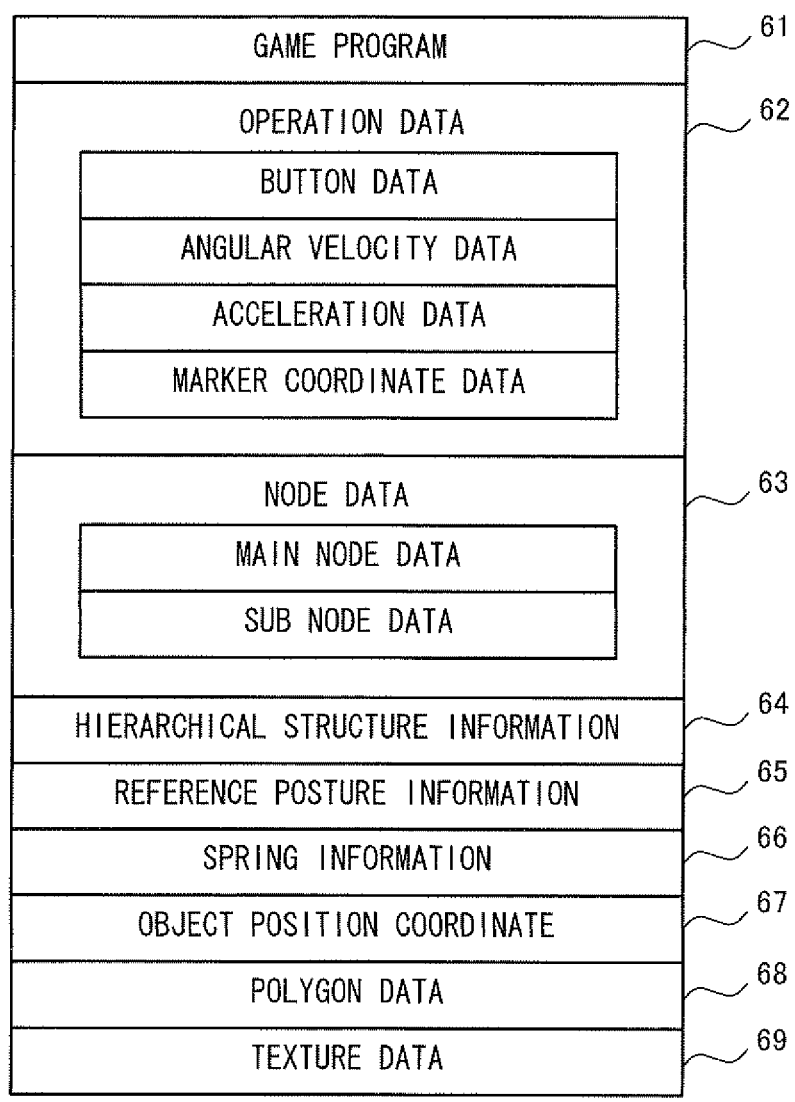
FIG. 30 shows a memory map of an external main memory.

FIG. 30 shows a part of the program and data which are stored on the external main memory 12 during the execution of the game processing. Stored on the external main memory 12 are a game program 61 read from the optical disc 4, operation data 62 received from the input device 8, node data 63 which is a collection of data regarding the plurality of nodes forming the character object, hierarchical structure information 64 which defines the hierarchical structure (parent-child relationship) of the nodes, reference posture information 65 which defines the position and direction of each node in the reference posture, spring information 66 which is a collection of information regarding the virtual springs connecting the main nodes, an object position coordinate 67 representing the position of each object such as the character object or the jet ski in the virtual space, polygon data 68 representing an external shape of each object in the virtual space, texture data 69 representing the pattern on the surface of each object in the virtual space, and the like. These programs and data may be partially or entirely stored in a storage area other than the external main memory 12, for example, the internal main memory 11e or the like.

The operation data 62 includes button data representing the state of each of various switches provided on the controller 5, angular velocity data which is output from the gyrosensor unit 7 attached to the controller 5, acceleration data which is output from the acceleration sensor 37 in the controller 5, and marker coordinate data which is output from the image processing circuit 41 in the controller 5.

The node data 63 includes main node data which is a collection of data regarding each main node, and sub node data which is a collection of data regarding each sub node.

Figure 31:
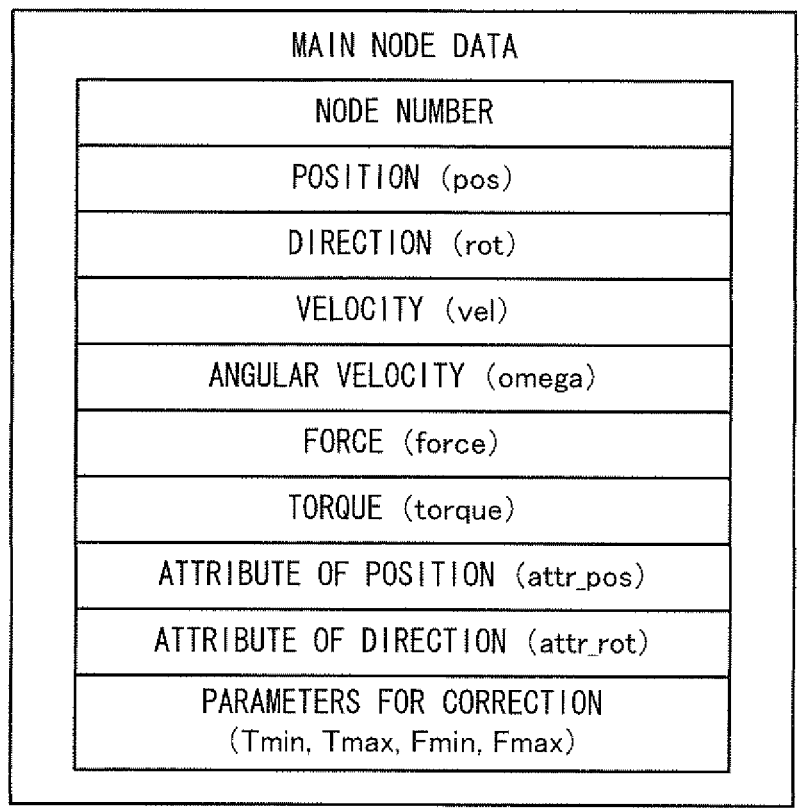
FIG. 31 shows the details of main node data.

FIG. 31 shows the details of the main node data. The main node data includes a plurality of parameters (i.e., node number, position, direction, velocity, angular velocity, force, torque, attribute of position, attribute of direction, parameters for correction) for each main node.

The node number is the number for identifying the plurality of nodes forming the character object.

The "position" (pos) is a parameter representing the absolute position of the main node in the virtual space, and is represented by, for example, a three-dimensional vector.

The "direction" (rot) is a parameter representing the absolute direction of the main node in the virtual space, and is represented by, for example, a quaternion.

The "velocity" (vel) is a parameter representing the absolute velocity of the main node in the virtual space, and is represented by, for example, a three-dimensional vector.

The "angular velocity" (omega) is a parameter representing the absolute angular velocity of the main node in the virtual space, and is represented by, for example, a three-dimensional vector.

The "force" (force) is a parameter representing the absolute force acting on the main node in the virtual space, and is represented by, for example, a three-dimensional vector.

The "torque" (force) is a parameter representing the absolute torque acting on the main node in the virtual space, and is represented by, for example, a three-dimensional vector.

The "attribute of position" (attr_pos) is a parameter representing the attribute of the "position" of the main node, and represents either "controlled" or "free".

The "attribute of direction" (attr_rot) is a parameter representing the attribute of the "direction" of the main node, and represents either "controlled" or "free".

The "parameters for correction" (Tmin, Tmax, Fmin, Fmax) are parameters used for correction processing described later.

As the "position" of the main node having the attribute of "controlled", any value can be directly set. By contrast, the value of the "position" of the main node having the attribute of "free" is determined by the calculation using the virtual spring described above. Accordingly, for moving the position of the hips of the character object in accordance with the input operation of the player in the state where both hands and both feet of the character object are fixed to the jetski as shown in FIG. 11A through FIG. 11C, the "attribute of position" of each of the left hand nodes the right hand node, the left foot node, the right foot node and the hip node may be set to "controlled", and the "attribute of position" of each of the remaining main nodes is set to "free". The same is applicable to the "attribute of direction". The "attribute of position" and the "attribute of direction" of each main node may be changed in accordance with the situation of the game.

Figure 32:
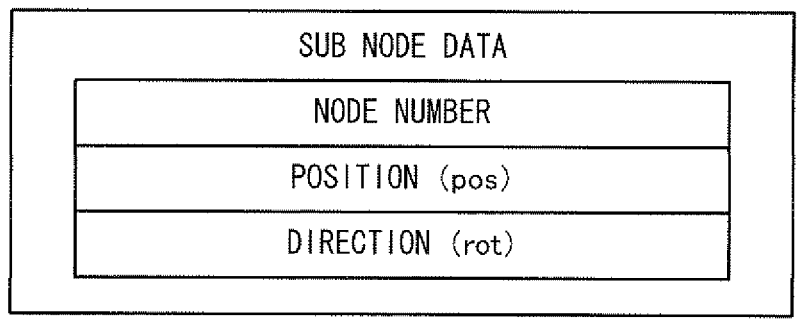
FIG. 32 shows the details of sub node data.

FIG. 32 shows the details of the sub node data. The sub node data includes a plurality of parameters (i.e., node number, position, direction) for each main node.

The node number is the number for identifying the plurality of nodes forming the character object. The node numbers assigned to the main nodes and the node numbers assigned to the sub nodes do not overlap.

The "position" (pos) is a parameter representing the absolute position of the sub node in the virtual space, and is represented by, for example, a three-dimensional vector.

The "direction" (rot) is a parameter representing the absolute direction of the sub node in the virtual space, and is represented by, for example, a quaternion.

Figure 33:
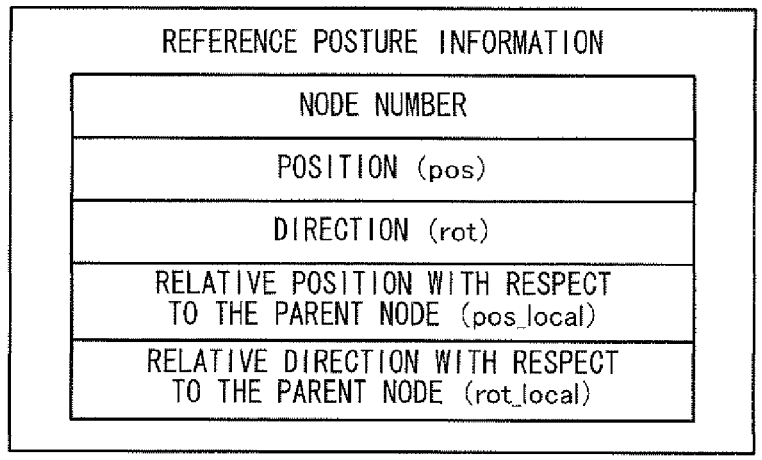
FIG. 33 shows the details of reference posture information.

FIG. 33 shows the details of the reference posture information 65. The reference posture information 65 includes a plurality of parameters (i.e., node number, position, direction, relative position with respect to the parent node, relative direction with respect to the parent node) for each of all the main node and sub nodes.

The node number is the number for identifying the plurality of nodes forming the character object.

The "position" (pos) is a parameter representing the absolute position of the node in the reference posture, and is represented by, for example, a three-dimensional vector.

The "direction" (rot) is a parameter representing the absolute direction of the node in the reference posture, and is represented by, for example, a quaternion.

The "relative position with respect to the parent node" (pos_local) is a parameter representing the relative position of the node with respect to the parent node, and is represented by, for example, a three-dimensional vector.

The "relative direction with respect to the parent node" (rot_local) is a parameter representing the relative direction of the node with respect to the parent node, and is represented by, for example, a quaternion.

The value of the "relative position with respect to the parent node" and the value of the "relative direction with respect to the parent node" of each node in the reference posture information 65 may be calculated in real time when necessary in accordance with the hierarchical structure information 64 and the "position" and "direction" of each node included in the reference posture information 65.

For changing the reference posture in accordance with the time or the situation of the game as described above, for example, each parameter included in the reference posture may be changed in real time, or one reference posture information set may be selected from a prepared plurality of reference posture information sets in accordance with the situation of the game.

Figure 34:
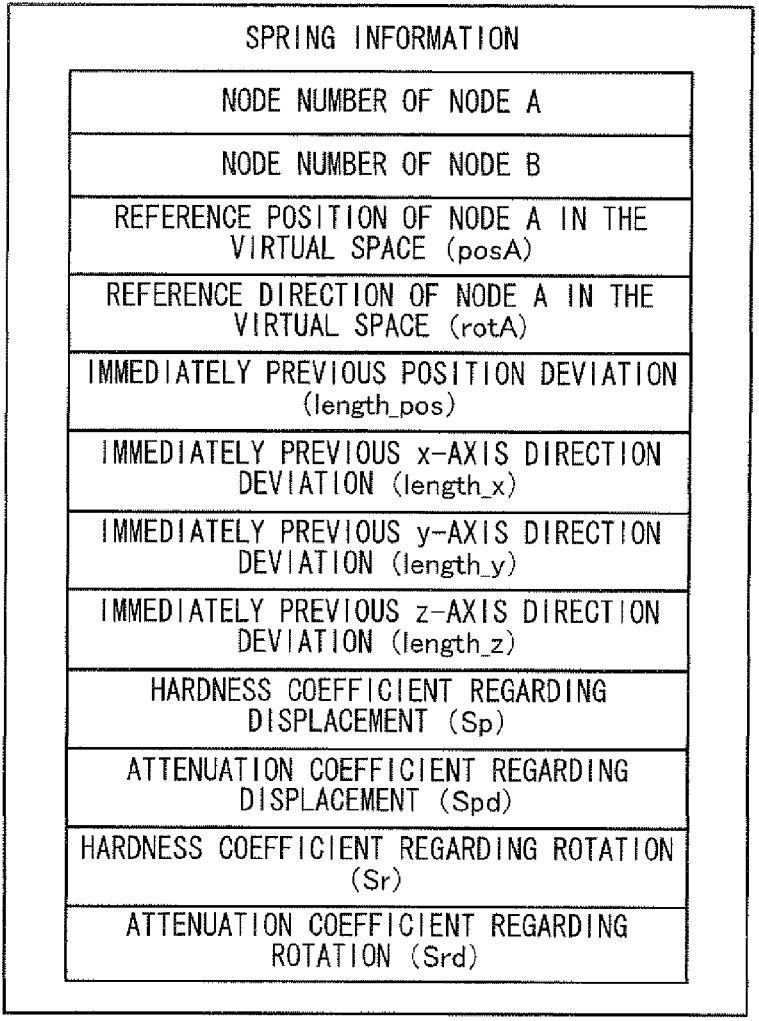
FIG. 34 shows the details of spring information.

FIG. 34 shows the details of the spring information 66. The spring information 66 includes a plurality of parameters (i.e., node number of node A, node number of node B, reference position of node A in the virtual space, reference direction of node A in the virtual space, immediately previous position deviation, immediately previous x-axis direction deviation, immediately previous y-axis direction deviation, immediately previous z-axis direction deviation, hardness coefficient regarding displacement, attenuation coefficient regarding displacement, hardness coefficient regarding rotation, attenuation coefficient regarding rotation) for each of the virtual springs connecting the main nodes shown in, for example, FIG. 23.

The "node number of node A" is the node number of one of two main nodes connected by the spring (hereinafter, such a node will be referred to as the "node A").

The "node number of node B" is the node number of the other of the two main nodes connected by the spring (hereinafter, such a node will be referred to as the "inode B").

The "reference position of node A in the virtual space" (posA) is a parameter representing the value obtained by converting the relative position of node A with respect to node B in the reference posture (reference relative position) into an absolute position in the virtual space based on the absolute position and the absolute direction of node B in the virtual space, and is represented by, for example, a three-dimensional vector.

The "reference direction of node A in the virtual space" (rotA) is a parameter representing the value obtained by converting the relative direction of node A with respect to node B in the reference posture (reference relative direction) into an absolute direction in the virtual space based on the absolute direction of node B in the virtual space, and is represented by, for example, a three-dimensional vector.

The "immediately previous position deviation" (length_pos) is a parameter for storing the latest of the calculation results of the magnitude (scalar) of the deviation between the reference position and the current position of node A in the virtual space, the calculation results being obtained in the past.

The "immediately previous x-axis direction deviation" (length_x) is a parameter for storing the latest of the calculation results of the magnitude (scalar) of the deviation between the reference direction and the current direction of node A in the virtual space (the deviation of the x-axis direction of the local coordinate system which represents the direction of node A), the calculation results being obtained in the past.

The "immediately previous y-axis direction deviation" (length_y) is a parameter for storing the latest of the calculation results of the magnitude (scalar) of the deviation between the reference direction and the current direction of node A in the virtual space (the deviation of the y-axis direction of the local coordinate system which represents the direction of node A), the calculation results being obtained in the past.

The "immediately previous z-axis direction deviation" (length_z) is a parameter for storing the latest of the calculation results of the magnitude (scalar) of the deviation between the reference direction and the current direction of node A in the virtual space (the deviation of the z-axis direction of the local coordinate system which represents the direction of node A), the calculation results being obtained in the past.

The "hardness coefficient regarding displacement" (Sp) is the hardness coefficient regarding the displacement of the spring.

The "attenuation coefficient regarding displacement" (Spd) is the attenuation coefficient regarding the displacement of the spring.

The "hardness coefficient regarding rotation" (Sr) is the hardness coefficient regarding the rotation of the spring.

The "attenuation coefficient regarding rotation" (Srd) is the attenuation coefficient regarding the rotation of the spring.

(Flow of the Game Processing)

Now, with reference to the flowcharts in FIG. 35 through 41, the flow of the game processing executed by the CPU 10 based on the game program 61 stored on the optical disc 4 will be described. The game processing described below may be partially executed by another processor such as the GPU 11b by an instruction from the CPU 10.

At the start of the execution of the game program 61, in step S10, the CPU 10 performs initial processing. The initial processing includes inputting an initial value for various variables used in the game processing, locating the objects such as the character object, the jetski and the like at initial positions in the virtual space, and locating the virtual camera at an initial position.

In step S11, the CPU 10 updates the reference posture of the character object when necessary. This processing is performed in order to make the reference posture of the character object changeable appropriately in accordance with the time or the situation of the game as shown in FIG. 20 through FIG. 22.

In step S12, the CPU 10 updates the "attribute of position" and the "attribute of direction" of each main node when necessary. As described above, the "attribute of position" and the "attribute of direction" of each main node are set to either "controlled" or "tree". Here, these values are appropriately updated in accordance with the situation of the game. In the following description, the "position" and "direction" of a main node having the attribute of "controlled" will be referred to as the "position (controlled)" and "direction (controlled)". The "position" and "direction" of a main node having the attribute of "free" will be referred to as the "position (free)" and "direction (free)".

In step S13, the CPU 10 obtains the operation data 62 from the input device 8 and stores the operation data 62 on the external main memory 12.

In step S14, the CPU 10 performs movement control of the jetski in the virtual space (including the control on the turning described above with reference to FIG. 10A through FIG. 10C) based on the operation data 62, and updates the positions of the character object and the jetski (object position coordinate 67) in the virtual space.

In step S15, the CPU 10 performs posture control processing (processing for updating the posture of the character object). The details of the posture control will be described later.

In step S16, the CPU 10 generates a game image representing the character object as seen from the virtual camera using the polygon data 68 and the texture data 69 based on the positions of the character object and the jetski updated in step S14 and the posture of the character object updated in step S15.

In step S17, the CPU 10 finds whether or not the game has been finished. When the game has been finished, the CPU 10 finishes the execution of the game program 61. When the game has not been finished, the processing returns to step S11.

The processing of steps S11 through S17 is executed repeatedly in synchronization with the updating cycle of the screen of the TV 2. Thus, on the screen of the TV 2, how the character object maneuvers the jetski is displayed.

(Details of the Posture Control Processing)

Figure 35:
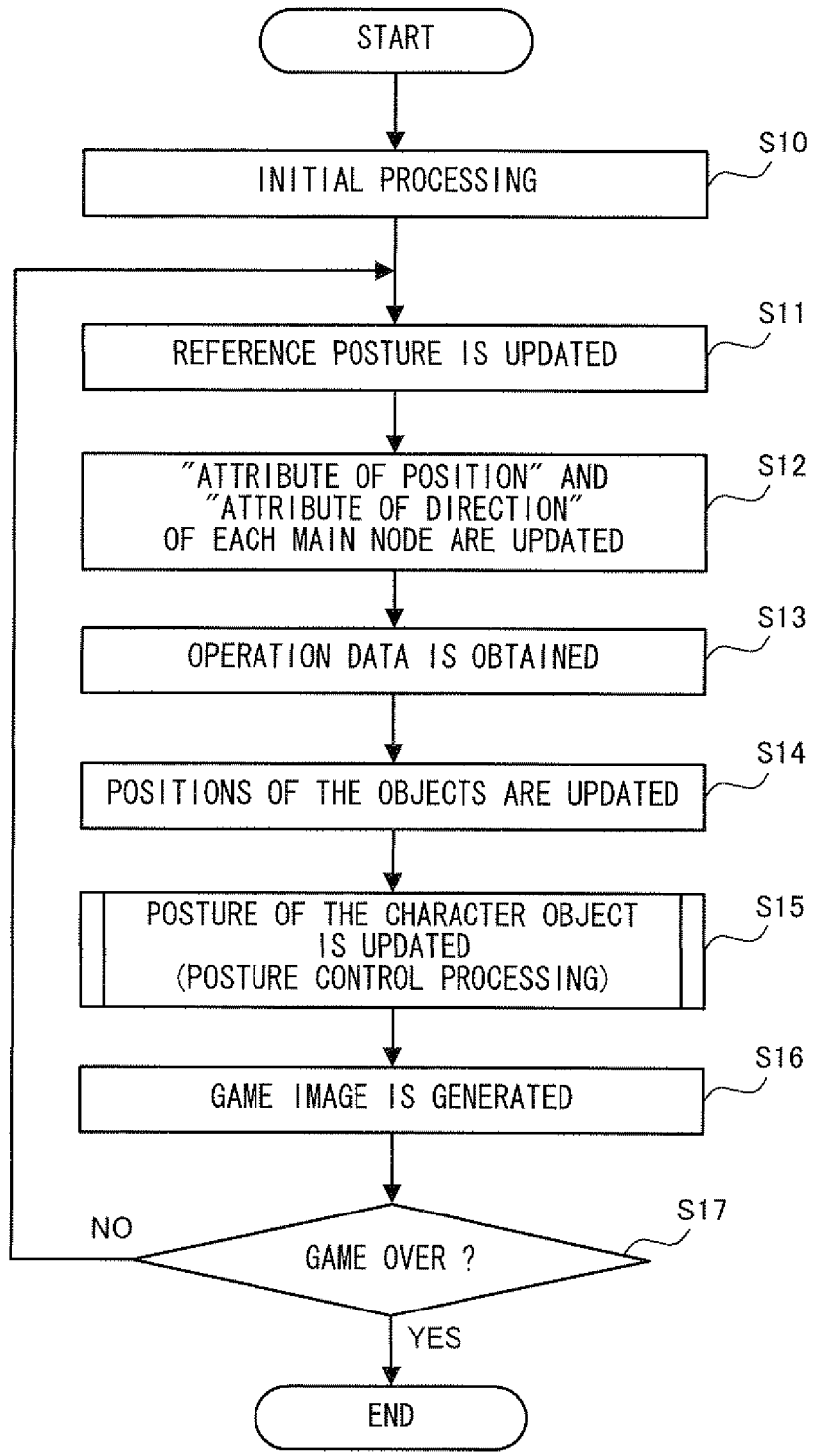
FIG. 35 is a flowchart showing a flow of main processing based on a game program.
Figure 36:
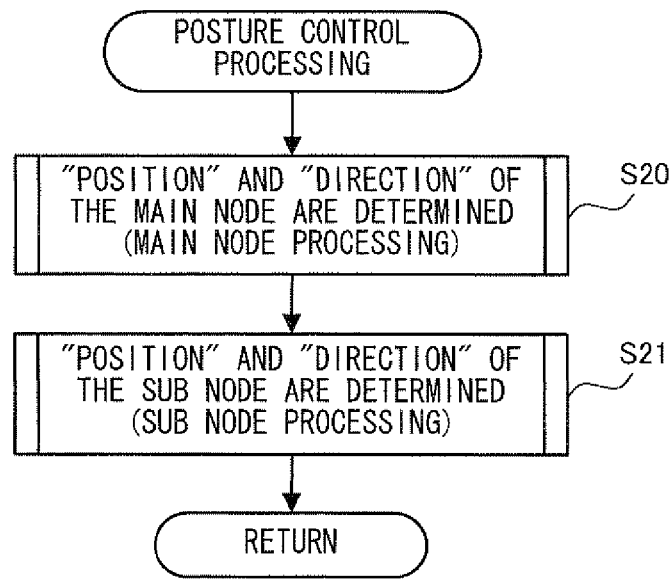
FIG. 36 is a flowchart showing the details of posture control processing.

Now, with reference to FIG. 36, the details of the posture control processing in step S15 in FIG. 35 will be described.

In step S20, the CPU 10 executes main node processing (processing for determining the "position" and "direction" of each main node). The details of the main node processing will be described later.

In step S21, the CPU 10 executes sub node processing (processing for determining the "position" and "direction" of each sub node). The details of the sub node processing will be described later.

(Details of the Main Node Processing)

Figure 37:
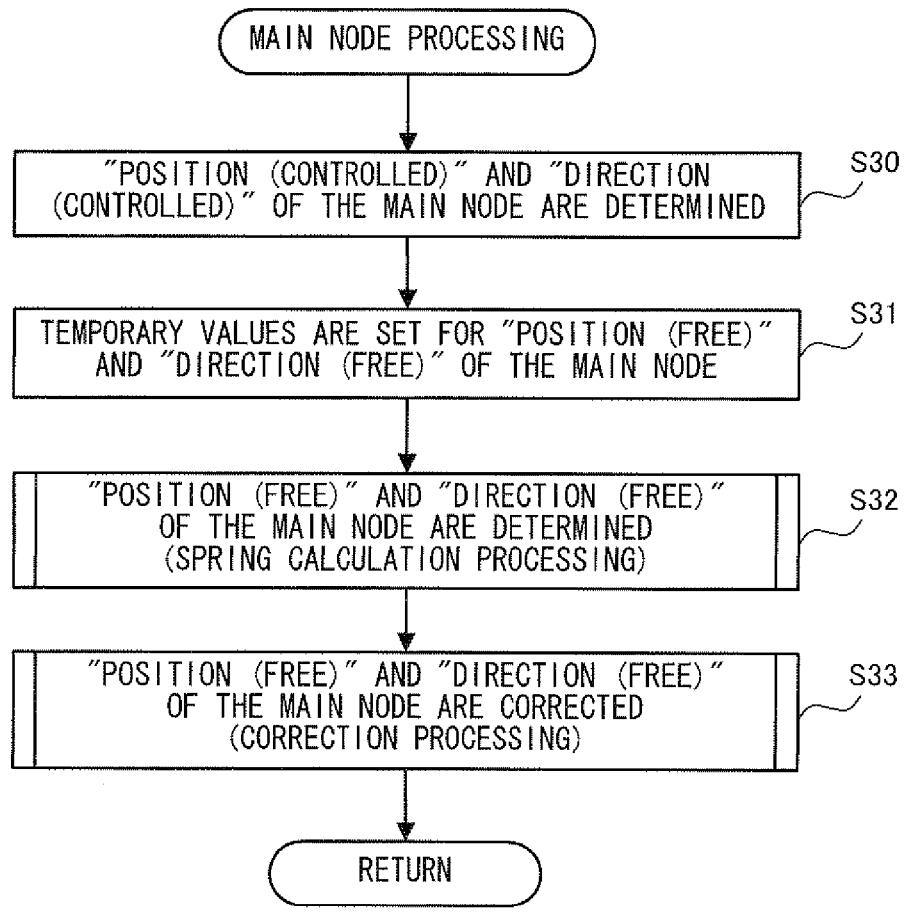
FIG. 37 is a flowchart showing the details of main node processing.

Now, with reference to FIG. 37, the details of the main node processing in step S20 in FIG. 36 will be described.

In step S30, the CPU 10 determines the "position (controlled)" and the "direction (controlled)" of each of the main nodes for which the attribute of "controlled" is set. Specifically, in the "position" parameter of each main node for which the "attribute of position" is set to "controlled", a desired value is put. In addition, in the "direction" parameter of each main node for which the "attribute of direction" is set to "controlled", a desired value is put. This processing is executed in order to, for example, fix both feet and both hands of the character object to the jetski or move the hips of the character object to a position in accordance with the posture of the input device 8 in the example of FIG. 11A through FIG. 11C.

In step S31, the CPU 10 sets a provisional value in the "position (free)" and the "direction (free)" of each of the main nodes for which the attribute of "free" is set. Hereinafter, the value set in the "position (free)" will be referred to as the "provisional position", and the value set in the "direction (free)" will be referred to as the "provisional direction". The provisional position and provisional direction which are set here may be the values of the "position (free)" and the "direction (free)" determined in the processing of the immediately previous frame, may be values set based on the reference posture, or may be predetermined values.

In step S32, the CPU executes spring calculation processing (processing for determining the "position (free)" and the "direction (free)" of each main mode). The details of the spring calculation processing will be described later.

In step S33, the CPU executes correction processing (processing for correcting the "position (free)" and the "direction (free)" of each main mode when necessary). The details of the correction processing will be described later.

(Details of the Spring Calculation Processing)

Now, with reference to FIG. 38, the details of the spring calculation processing in step S32 in FIG. 37 will be described.

In step S40, the CPU 10 resets the "force" and the "torque" of each main node to 0.

in step S41, the CPU 10 selects of one unselected spring among the plurality of springs defined in the spring information 66. In the following description of step S42 through S49, the simple term "spring" refers to the spring selected in step S41.

In step S42, the CPU 10 calculates the reference relative position of one node (hereinafter, referred to as "node A") of a pair of main nodes connected to each other by the spring with respect to the other node (hereinafter, referred to as "node B") based on the reference posture information 65. As described above, the "reference relative position" of node A with respect to node B is the relative position of node A with respect to node B in the reference posture.

In step S43, the CPU 10 calculates the value of the "reference position of node A in the virtual space" and stores the value on the external main memory 12. As described above, the value of the "reference position of node A in the virtual space" is calculated by converting the reference relative position of node A with respect to node B into an absolute position in the virtual space based on the absolute position and the absolute direction of node B in the virtual space.

In step S44, the CPU 10 calculates the deviation (displacement) between the current position and the reference position of node A in the virtual space, and calculates the force (three-dimensional vector) exerted by the spring on node A and node B based on the deviation. Where the force exerted by the spring on node A is F (three-dimensional vector), the force exerted by the spring on node B is −F (three-dimensional vector). The value of F is calculated by, for example, the following program code.

length=|S<Jc[A],Jc[B]>.posA−Jc[A].pos| dir=(S<Jc[A],Jc[B]>.posA−Jc[A].pos)/length

F=(Sp*length−Spd*|S<Jc[A],Jc[B]>.length_pos−length|)*dir

S<Jc[A],Jc[B]>.length_pos=length(update)

In the above program code, "length" represents the magnitude of the deviation between the current position and the reference position of node A in the virtual space, and "dir" represents the direction of the deviation. "Jc[A]" represents a specific main node (node A) among the plurality of main node. "S<JC[A], Jc[B]>.posA" represents the parameter "posA" of the spring connecting node A and node B. "Jc[A].posA" represents the parameter "pos" of node A. "Sp" is the "hardness coefficient regarding displacement", and "Spd" is the "attenuation coefficient regarding displacement". The values of "Sp" and "Spd" may be set to be different spring by spring. As the value of "Sp" of a spring is larger, the positional relationship of two main odes connected by the spring is closer to the positional relationship thereof in the reference posture. By contrast, as the value of "Sp" of a spring is smaller the positional relationship of two main nodes connected by the spring is farther to the positional relationship thereof in the reference posture. For example, the value of "Sp" of the spring connecting the hip node and the chest node may be set to be about ten times the value of "Sp" of the spring connecting the right hand node and the chest node.

In step S45, the CPU 10 updates the "force" (force) of each of node A and node B based on the value of F calculated in step S44. The "force" of node A (Jc[A].force) and the "force"[1] of node B (Jc[B].force) are calculated by, for example, the following program code.

Jc[A].force=Jc[A].force+F

Jc[B].force=Jc[B].force−F

In step S46, the CPU 10 calculates the reference relative direction of node A with respect to node B based on the reference posture information 65. As described above, the "reference relative direction" of node A with respect to node B is the relative direction of node A with respect to node B in the reference posture.

In step S47, the CPU 10 calculates the value of the "reference direction of node A in the virtual space" and stores the value on the external main memory 12. As described above, the value of the "reference direction of node A in the virtual space" is calculated by converting the reference relative direction of node A with respect to node B into an absolute direction in the virtual space based on the absolute direction of node B in the virtual space.

Figure 42A:
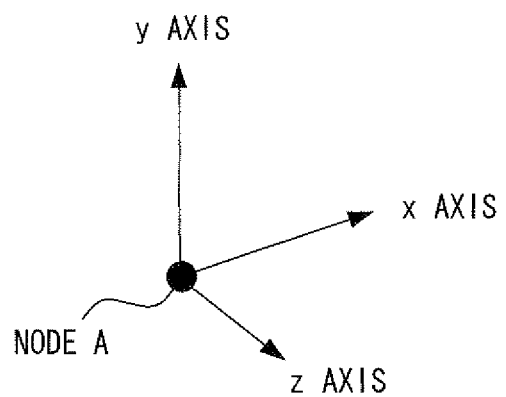
FIG. 42A shows the reference direction of node A in a virtual space.
Figure 42B:
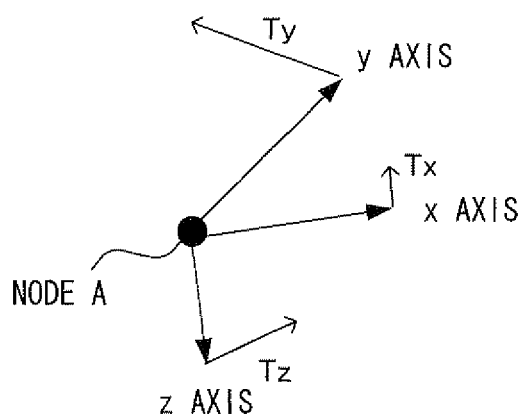
FIG. 42B shows a torque exerted by the spring on node A.

In step S48, the CPU 10 calculates the deviation between the current direction and the reference direction of node A in the virtual space, and calculates the torque exerted by the spring on node A and node B based on the deviation. In this embodiment, as an example, the torque exerted by the spring on node A is calculated as the torque (Tx, Ty, Tz) exerted by the spring on each axis (x axis, y axis, z axis) of the local coordinate system which represents the direction of node A (see FIG. 42B). FIG. 42A shows the reference direction of node A in the virtual space, and FIG. 42B shows the current direction of node A in the virtual space. The torque exerted by the spring on each axis (x axis, y axis, z axis) of the local coordinate system which represents the direction of node B is, respectively, −Tx, −Ty and −Tz. The value of Tx is calculated by, for example, the following program code.

length=|Xaxis(S<Jc[A],Jc[B]>.rotA)−Xaxis(Jc[A].rot)| dir=(Xaxis(S<Jc[A],Jc[B]>.rotA)−Xaxis(Jc[A].rot))/length

Tx=(Sr*length−Srd*|S<Jc[A],Jc[B]>.length_x−length|)*dir

S<Jc[A],Jc[B]>.length_x=length(update)

In the above program code, "length" represents the magnitude of the deviation between the current direction and the reference direction of node A (x axis of the local coordinate system which represents the direction of node A) in the virtual space, and "dir" represents the direction of the deviation. "Xaxis(rot)" represents the x axis of the local coordinate system which represents the direction (rot). The same is also applicable to Yaxis and Zaxis described later. "Sr" is the "hardness coefficient regarding rotation", and "Srd" is the "attenuation coefficient regarding rotation". The values of "Sr" and "Srd" may be set to be different spring by spring.

Ty and Tz are calculated in substantially the same manner.

In step S49, the CPU 10 updates the "torque" (torque) of each of node A and node B based on Tx, Ty and Tz calculated in step S48. The "torque" of node A (Jc[A].torque) and the "torque" of node B (Jc[B] torque) are calculated by, for example, the following program code. "×" is the exterior product symbol.

Jc[A].torque=Jc[A].torque+Xaxis(Jc[A].rot)×Tx+Yaxis(Jc[A].rot)×Ty+Zaxis(Jc[A].rot)×Tz Jc[B].torque=Jc[B].torque−Xaxis(Jc[B].rot)×Tx−Yaxis(Jc[B].rot)×Ty−Zaxis(Jc[B].rot)×Tz In step S50, the CPU 10 finds whether or not all the springs defined in the spring information 66 have been selected. When all the springs have been selected, the processing advances to step S51. When there is a spring which has not been selected, the processing returns to step S41.

In step S51, the CPU 10 updates the "position (free)" and the "direction (free)" of each main node based on the "force" and the "torque" of the respective main node. The "force" and the "torque" of each main node used here are respectively a total of forces and a total of torques received from one or more springs connected to the respective main node. The "position (free)" (Jc.pos) and the "direction (free)" (Jc.rot) of each main node are calculated by, for example, the following program code.

$$Jc.vel = Jc.vel * Dp + Jc.\text{force}$$

$$Jc.pos = Jc.pos + Jc.vel$$

$$Jc.\text{omega} = Jc.\text{omega} * Dr + Jc.\text{torque}$$

$$Jc.rot = [1.0, Jc.\text{omega} * 0.5] * Jc.rot$$

"[1.0, Jc.omega*0.5]" is a quaternion for changing the direction based on the angular velocity. "Dp" is the attenuation coefficient regarding displacement in the virtual space, and "Dr" is the attenuation coefficient regarding rotation in the virtual space. For "Dp" and "Dr", predetermined values respectively fulfilling 0<Dp<1 and 0<Dr<1 are set.

In step S52, the CPU 10 finds whether or not the series of processing in steps S40 through S51 has been repeated a predetermined number of times (e.g., four times). When the series of processing in steps S40 through S51 has been repeated the predetermined number of times, the CPU 10 finishes the spring calculation processing. When not, the processing returns to step S40. The series of processing in steps S40 through S51 does not absolutely need to be repeated a plurality of times, but it is expected that as the series of processing is repeated a larger number of times, the posture of the character object in the virtual space is more stabilized and becomes more natural.

(Details of the Correction Processing)

Now, with reference to FIG. 39, the details of the correction processing in step S33 in FIG. 37 will be described.

Figure 43A:
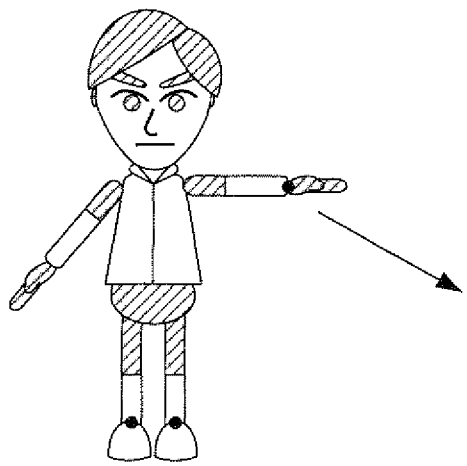
FIG. 43A shows an example of a state of the character object.
Figure 43B:
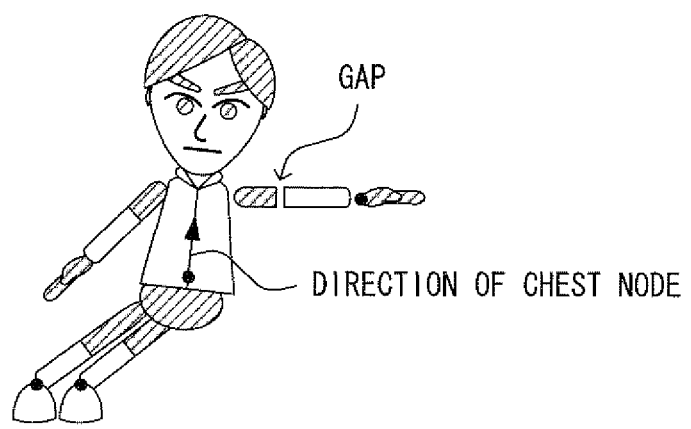
FIG. 43B shows an example of a state of the character object before being corrected by the correction processing.

In the above-described spring calculation processing, the position and direction of each main node is determined based on the reference posture. However, the restriction on the distance between the main nodes is not considered at all. Therefore, depending on the value of the "position" or the "direction" of a main node having the attribute of "controlled", the distance between the main nodes may possibly be set to an unnatural value. For example, the distance between the hip node and the right foot node should not exceed the maximum distance between the hips and the right ankle of the character object. However, merely by the above-described spring calculation processing, it may be possible that the distance between the hip node and the right foot node exceeds the maximum distance between the hips and the right ankle of the character object and as a result, the hip part and the foot part of the character object appear to be separate from each other in the game image. For examples when, from the state where the "position" and "direction" or each of the right foot node and the left foot node of the character object are fixed as shown in FIG. 43A, the left hand node is moved in the direction of the arrow in FIG. 43A, there may possibly a gap in the arm or the like of the character object as shown in FIG. 43B. Accordingly, when the distance between the main nodes connected by the spring exceeds a predetermined distance limit, the correction processing corrects the position or direction of each main node such that the distance is equal to or less than the predetermined distance limit.

In step S60, the CPU 10 resets the "parameters for correction" (Tmin, Tmax, Fmin, Fmax) of each main node to 0.

In step S61, the CPU 10 selects one unselected spring among the plurality of springs defined in the spring information 66. In the following description of step S62 through S64, the simple term "spring" refers to the spring selected in step S61.

In step S62, the CPU 10 finds whether or not the distance between two main node (node A and node B) connected by the spring exceeds a distance limit. When the distance exceeds the distance limit, the processing advances to step S63. When the distance does not exceed the distance limit, the processing advances to step S65. The distance limit is predefined for each spring.

In step S63, the CPU 10 calculates a vector representing the moving distance and the moving direction of node A which are necessary to decrease the distance between node A and node B to the distance limit (such a vector is similar to a vector representing the attracting force acting between node A and node B and so will be referred to as the "attracting force vector", hereinafter). The attracting force vector (modifyAB) is calculated by, for example, the following program code.

$$\text{modify}AB = (C.\text{length} - \text{length}AB) * (Jc[A].pos - Jc[B].poS)/\text{length}AB$$

In the above program code, "C.length" represents the distance limit between node A and node B, and "lengthAB" represents the distance between node A and node B.

In step S64, the CPU 10 updates the "parameters for correction" (Tmin, Tmax, Fmin, Fmax) of each of node A and node B based on the attracting force vector. The "parameters for correction" of node A (JcExA.Tmin, JcExA.Tmax, JcEx-A.Fmin, JcExA.Fmax) and the "parameters for correction" of node B (JcExB.Tmin, JcExB.Tmax, JcExB.Fmin, JcExB.Emax) are calculated by, for example, the following program code.

$$F = Cp * \text{modify}AB$$

$$T = Cr * \text{modify}AB$$

$$JcExA.F\text{min} = \text{Min}(F, JcExA.F\text{min})$$

$$JcxA.F\text{max} = \text{Max}(F, JcExA.F\text{max})$$

$$JcExA.T\text{min} = \text{Min}(T, JcExA.T\text{min})$$

$$JcExA.T\text{max} = \text{Max}(T, JcExA.T\text{max})$$

$$JcxB.F\text{min} = \text{Min}(-F, JcExB.F\text{min})$$

$$JcExB.F\text{max} = \text{Max}(-F, JcExB.F\text{max})$$

$$JcExB.T\text{min} = \text{Min}(-T, JcExB.T\text{min})$$

$$JcExB.T\text{max} = \text{Max}(-T, JcExB.T\text{max})$$

In the above program code, "Cp" represents the return width coefficient, and "Cr" represents the correction amount of the direction. "Min" is an operator for selecting the minimum value for each component (x component, y component, z component) from a plurality of three-dimensional vectors to obtain a new three-dimensional vector. "Max" is an operator for selecting the maximum value for each component (x component, y component, z component) from the plurality of three-dimensional vectors to obtain a new three-dimensional vector.

In step S65, the CPU 10 finds whether or not all the springs defined in the spring information 66 have been selected. When all the springs have been selected, the processing advances to step S66. When there is a spring which has not been selected, the processing returns to step S61.

In step S66, the CPU 10 updates the "position (free)" and the "direction (free)" of each main node based on the values of the "parameters for correction". When the result of finding in step S62 is negative regarding all the springs, the processing in step S66 may be omitted. The "position (free)" and the "direction (free)" of each main node are calculated by, for example, the following program code using the parameters for correction of each main node (JcEx.Tmin, JcEx.Tmax, JcEx.Fmin, JcEx.Fmax).

$$Jc.pos=Jc.pos+(JcEx.Fmin+JcEx.Fmax)$$

$$Jc.rot=[1.0,(JcEx.Tmin+JcEx.Tmax)*0.5]*Jc.rot$$

In the above program code, the three-dimensional vector represented by "JcEx.Fmin+JcEx.Fmax" corresponds to the "modification vector" described later.

Figure 43C:
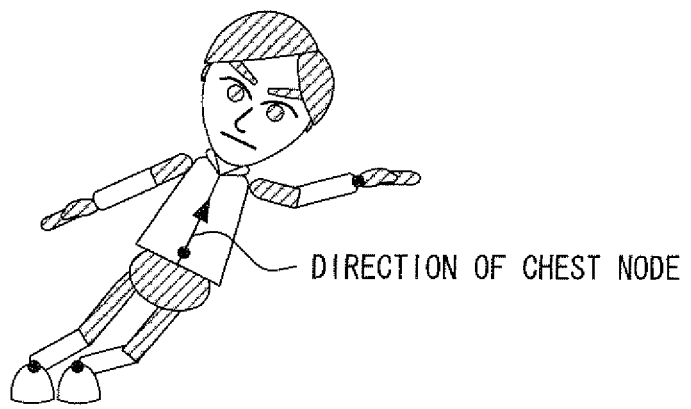
FIG. 43C shows an example of a state of the character object after being corrected by the correction processing.

In this embodiment, as described above, when the "position" of a main node is corrected, the "direction" is also corrected at the same time. The reason for this is that when there are two main nodes having a distance therebetween which exceeds the distance limit, it is preferable to correct the "direction" in addition to the "position" in order to obtain an appropriate state more easily by the correction and make the character object appear more natural. For example, for performing correction processing from the state of FIG. 43B to bury the gap in the left arm, as shown in FIG. 43C, it is preferable to correct such that the direction of the chest node (e.g., the y axis of the local coordinate system which represents the direction of the chest node) is made closer to the direction of the left hand node. In this manner, the posture of the character object can be made more natural.

In step S67, the CPU 10 finds whether or not the condition for finishing the correction processing have been fulfilled. When the condition has been fulfilled, the CPU 10 finishes the correction processing. When not, the processing returns to step S60. In this embodiment, as an example, it is determined that the condition for finishing has been fulfilled in the case where either one of the following two conditions (condition 1 and condition 2) is fulfilled.

(Condition 1)

The sum of the magnitudes of the attracting force vectors regarding each spring calculated in step S63 becomes a predetermined threshold value or less.

(Condition 2)

The series of processing in steps S60 through S66 has been repeated a predetermined number of times.

By providing condition 1, the correction processing can be finished immediately when there is no need for correction, or when the effect of the correction is obtained as a result of repeating the series of processing in steps S60 through S66 several times. Thus, extra processing load can be avoided. By providing condition 2 in addition to condition 1, wasteful repetition of the correction processing can be avoided when, for example, the effect of the correction cannot be obtained even by repeating the series of correction processing in steps S60 through S66 infinitely.

Now, the principle of the correction processing will be described in an easy-to-understand manner with reference to FIG. 44A through FIG. 46B.

Figure 44A:
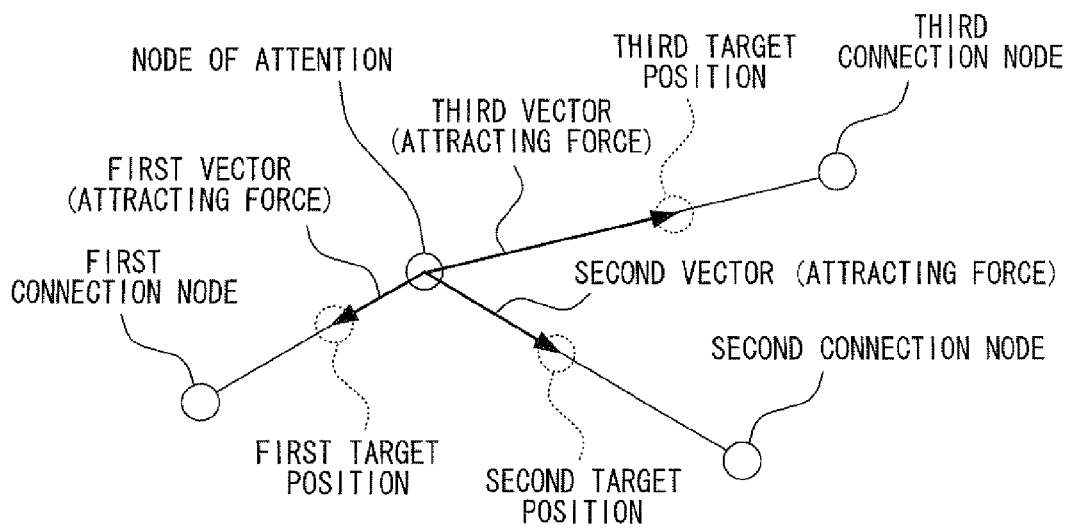
FIG. 44A shows a principle of the correction processing.

For easier understanding, as shown in FIG. 44A, an example in which the position of a node (referred to as the "node of attention") connected to three nodes of a first connection node, a second connection node and a third connection node is controlled will be described.

In FIG. 44A, a first target position represents the target position of the node of attention, which is determined based on the positional relationship between the node of attention and the first connection node. For example, when the distance between two main nodes connected by the spring exceeds a predetermined distance limit as described above, it is necessary to make the two nodes closer to each other. A first vector represents a target moving direction of the node of attention (first target moving direction) and a target moving amount of the node of attention (first target moving amount) for making the node of attention (first target moving direction) closer to the first target position. The magnitude of the first vector is determined, for example, in accordance with (e.g., in proportion to) the distance between the node of attention and the first target position. The first vector represents the direction in which the node of attention is attracted to the first connection node, and so is considered to represent the "attracting force" generated between the node of attention and the first connection node. The same is applicable to a second vector and a third vector.

Figure 44B:
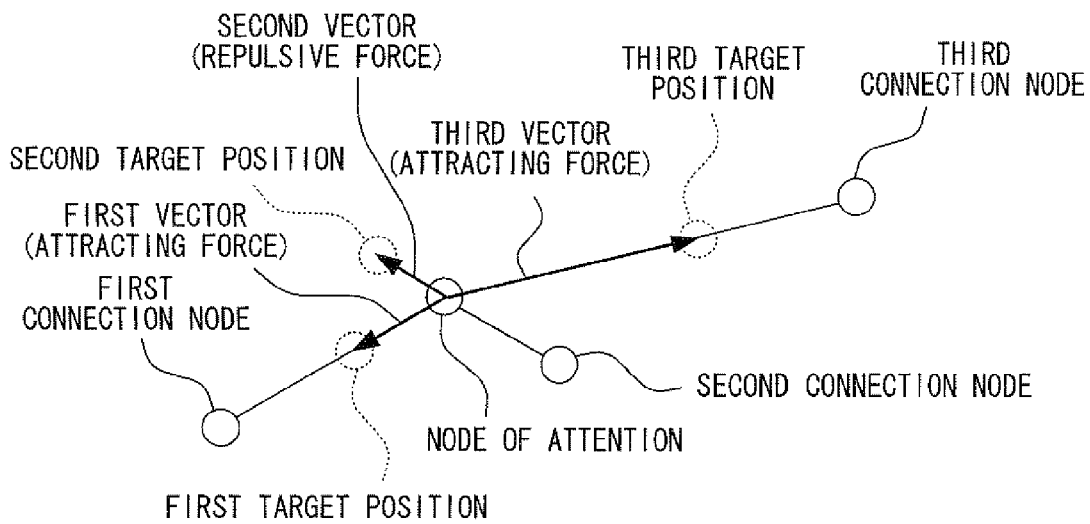
FIG. 44B shows a principle of the correction processing.

In order to prevent a part of an object from being displayed as being buried in another part thereof, in the case where the distance between two main nodes connected by the spring is shorter than a predefined necessary distance, the two main nodes may need to be distanced farther from each other. In FIG. 44B, the distance between the node of attention and the second connection node is shorter than the necessary distance. Therefore, a second target position is located as being farther from the second connection node as seen from the node of attention. In FIG. 44B, the second vector represents the direction in which the node of attention is made farther from the second connection node, and so is considered to represent a "repulsive force" generated between the node of attention and the second connection node.

Figure 45:
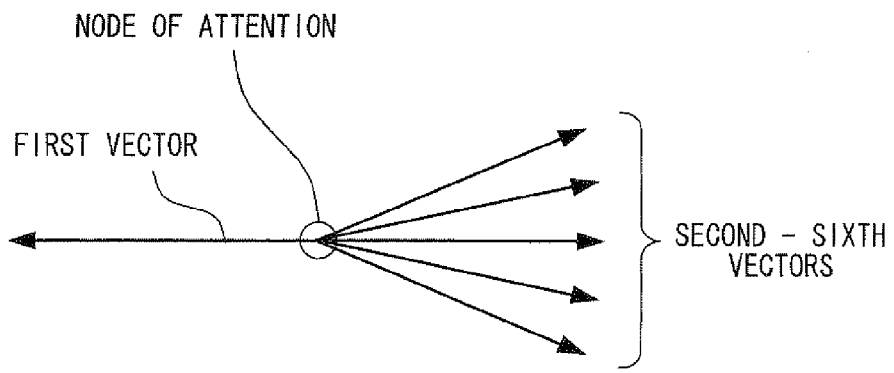
FIG. 45 shows a principle of the correction processing.

In FIG. 44A, the first through third vectors have different directions and magnitudes from one another. In such a state, how the node of attention is moved significantly influences the naturalness of the appearance of the character object in a finally obtained game image. According to an easily conceivable method, all the first through third vectors are added together, and the node of attention is moved in accordance with the vector obtained as the result of the addition. However, with such a method, the following occurs. In an example as shown in FIG. 45, the distance between the node of attention and each of second through sixth target positions are made closer to each other, whereas only the distance between the node of attention and the first target position are made significantly farther from each other. As a result, a specific portion of the character object appears conspicuously unnatural.

Figure 46A:
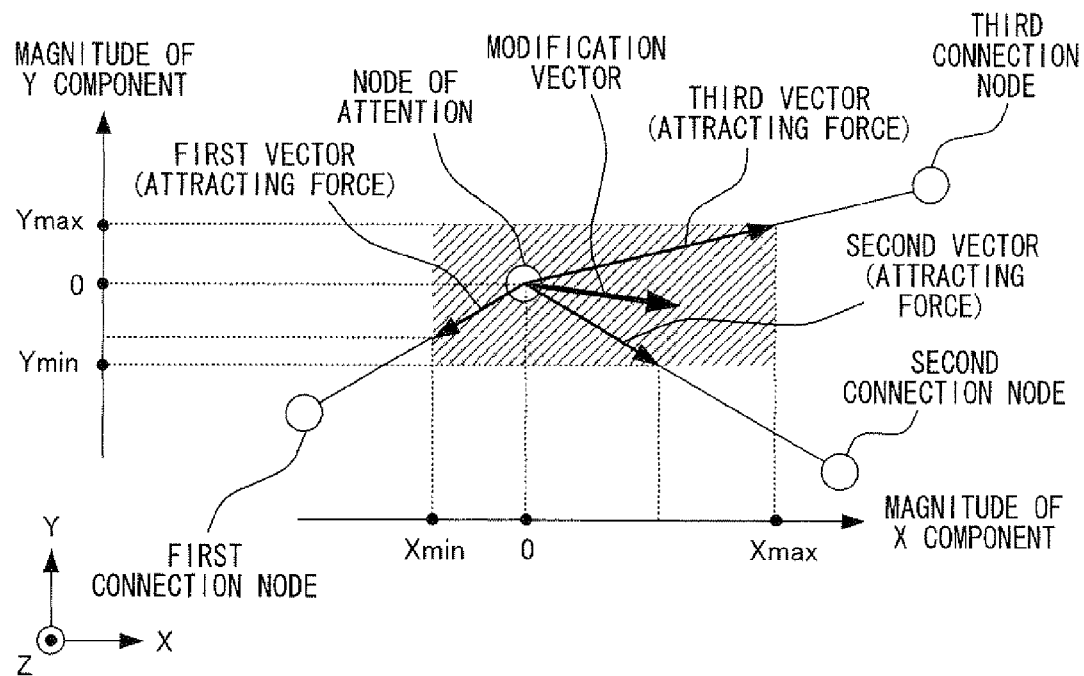
FIG. 46A shows a principle of the correction processing.
Figure 46B:
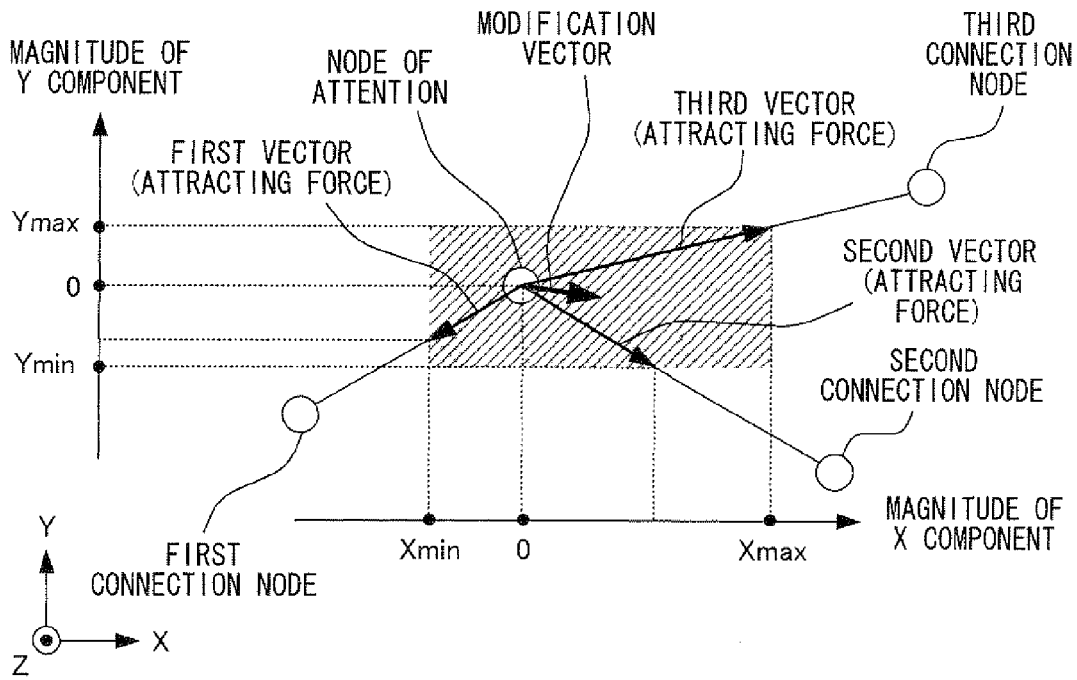
FIG. 46B shows a principle of the correction processing.

Hereinafter, with reference to FIG. 46A and FIG. 46B, a method for controlling the position of the node of attention in this embodiment will be described. FIG. 46A and FIG. 46B correspond to the example of FIG. 44A.

In this embodiment, regarding the three vectors of the first through third vectors, the maximum value and the minimum value of each component (X component, Y component, Z component) are obtained. Based on the six values thus obtained (maximum value of X component (Xmax), minimum value of X component (Xmin), maximum value of Y component (Ymax), minimum value of Y component (Ymin) maximum value of Z component (Zmax), minimum value of Z component (Zmin)), a modification vector for controlling the node of attention is determined, and the position of the node of attention is updated based on the modification vector.

In the example of FIG. 46A and FIG. 46B, the third vector has the maximum magnitude of X component among the first through third vectors. Accordingly, the value of the X component of the third vector is Xmax. Similarly, the first vector has the minimum magnitude of X component among the first through third vectors. Accordingly, the value of the X component of the first vector is Xmin. The same is applicable to the Y component and the Z component.

There are various methods for obtaining a modification vector from the six values of Xmax, Xmin, Ymax, Ymin, Zmax and Zmin. Herein, two representative methods wills be described.

According to a first method, (Xmax+Xmin, Ymax+Ymin, Zmax+Zmin) is used as the modification vector. Namely, according to the first method, a sum of the maximum value and the minimum value of each component is used as the value of the corresponding component of the modification vector. FIG. 46A shows a modification vector determined by the first method.

According to a second method, ((Xmax+Xmin)/2, (Ymax+Ymin)/2, (Zmax+Zmin)/2) is used as the modification vector. Namely, according to the second method, an average of the maximum value and the minimum value of each component is used as the value of the corresponding component of the modification vector. FIG. 46B shows a modification vector determined by the second method.

The modification vector determined by the first method has the same direction as, and twice the magnitude of, the modification vector determined by the second method. Accordingly, in the case where the position of the node of attention is corrected so as to move the node of attention by a distance in proportion to the magnitude of the modification vector, it is preferable to use the modification vector determined by the first method than to use the modification vector determined by the second method. The reason for this is that in this way, the correction amount is twice as large, and so the effect of the correction is larger.

According to the first method, the sum of the maximum value and the minimum value of each component is used as the value of the corresponding component of the modification vector. Alternatively, a synthesized value obtained by multiplying the sum of the maximum value and the minimum value of each component by a predetermined coefficient may be used as the value of the corresponding component of the modification vector. In the case where, for example, "0.5" is used as the predetermined coefficient, the same modification vector as that determined by the second method can be obtained.

In the example of FIG. 45, the magnitude of a modification vector determined by the first or second method is approximately 0. Accordingly, the inconvenience that only a specific portion of the character object appears conspicuously unnatural does not occur, unlike the above-described example (in which the position of the node of attention is moved in accordance with the vector obtained as the result of adding together all the first through third vectors).

(Details of the Sub Node Processing)

Now, with reference to FIG. 40, the details of the sub node processing in step S21 in FIG. 36 will be described.

In this embodiment, each sub node is classified in advance as either the first type sub node or the second type sub node. The type of sub node to which each sub node is classified is predefined for each sub node.

In step S70, the CPU 10 determines the "position" and the "direction" of each first type sub node. The position and direction of a first type sub node in the virtual space are uniquely determined based on the position and direction, in the virtual space, of predefined one specific node among at least one node connected to the first type sub node (in this embodiment, such a specific node will be referred to as the "parent node") and the reference posture. The position (Jnc.pos) and direction (Jnc.rot) of the first type sub node are calculated by, for example, the following program code.

$Jnc.pos = \text{Parent}(Jnc).rot * Ja.pos\_local + \text{Parent}(Jnc).pos$ $Jnc.rot = \text{Parent}(Jnc).rot * Ja.rot\_local$ In the above program code, "Parent(Jnc).pos" and "Parent(Jnc).rot" respectively represent the "position" and the "direction" of the parent node. "Ja.pos_local" and "Ja.rot_local" respectively represent the "relative position with respect to the parent node" and the "relative direction with respect to the parent node" of the first type sub node in the reference posture information.

In step S71, the CPU 10 executes second type sub node processing. In the second type sub node processing, the "position" and the "direction" of each second type sub node are determined. The position and direction of a second type sub node in the virtual space are uniquely determined based on the positions and directions of the parent node and the child node connected to the second type sub node in the virtual space and the reference posture. It is assumed that the positions and directions of the parent node and the child node connected to the second type sub node in the virtual space have already been determined by the main node processing or the processing in step S70. Hereinafter, with reference to FIG. 41, the details of the second type sub node processing will be described.

(Details of the Second Type Sub Node Processing)

In step S80, the CPU 10 selects one unselected second type sub node (i.e., a second type sub node, the "position" and the "direction" of which have not been determined) among the second type sub nodes. In the following description of step S81 through S85, the simple term "second type sub node" refers to the second type sub node selected in step S80.

In step S81, the CPU 10 calculates the reference distance between the second type sub node and the parent node(Lp), the reference distance between the second type sub node and the child node Lc), and the distance between the parent node and the child node in the virtual space (Lpc). Lp, Lc and Lpc are calculated by, for example, the following program code.

$Lp = |Ja.pos - \text{Parent}(Ja).pos|$ $Lc = |Ja.pos - \text{Child}(Ja).pos|$ $Lpc = |\text{Parent}(Jnc).pos - \text{Child}(Jnc).pos|$ In the above program code, "Ja.pos" represents the position of the second type sub node in the reference posture. "Parent (Ja).pos" and "Child(Ja).pos" respectively represent the positions of the parent node and the child node in the reference posture. "parent(Jnc).pos" and "Child(Jnc).pos" respectively represent the positions of the parent node and the child node in the virtual space.

In step S82, the CPU 10 calculates the "provisional direction" (rot') of the second type sub node in the virtual space. The "provisional direction" (rot') is the direction of a processing target node provisionally obtained based on the direction of the parent node in the virtual space and the relative direction of the processing target node with respect to the direction of the parent node in the reference posture. The "provisional direction" (rot') is calculated by, for example, the following program code.

$rot' = \text{Parent}(Jnc).rot * Ja.rot$

In the above program code, "Parent(Jnc).rot" represents the direction of the parent node in the virtual space, and "Ja.rot" represents the direction of the second type sub node in the reference posture.

Figure 47:
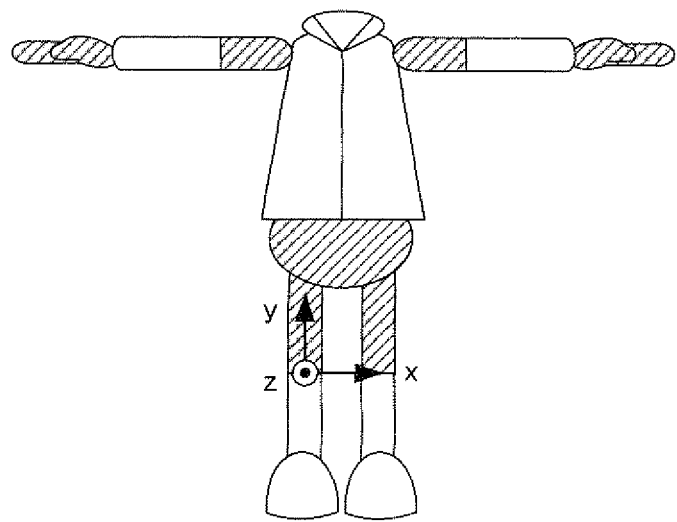
FIG. 47 shows a control method on a second type sub node.
Figure 48:
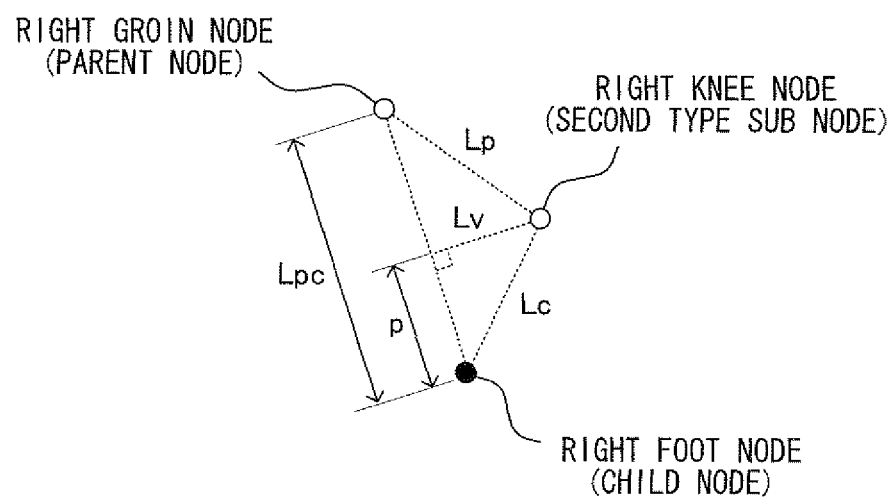
FIG. 48 shows a control method on a second type sub node.

In step S83, the CPU 18 calculates the direction in which the second type sub node should protrude from the straight line connecting the parent node and the child node. Specifically, the direction in which the second type sub node should protrude is calculated based on a vector (pc) directed from the child node toward the parent node and the "provisional direction" (rot') calculated in step S82. The direction in which the second type sub node should protrude is perpendicular to the rotation axis of the joint represented by the second type sub node. The rotation axis of the joint represented by the second type sub node is predefined for each second type sub node. In the example of FIG. 47, the rotation axis of the right knee is the x axis of the local coordinate system which represents the direction of the right knee. In the case where the x axis of the local coordinate system which represents the direction of the second type sub node is defined as the rotation axis of the second type sub node like this, the direction (v) in which the second type sub node should protrude is calculated by, for example, the following program code.

$$v = X\text{axis}(rot') \times pc/|pc|$$

In step S84, the CPU 10 calculates the length of protrusion of the second type sub node from the straight line connecting the parent node and the child node. The length of protrusion (Lv) is calculated by, for example, the following program code using Lp, Lc and Lpc (see FIG. 47).

$$p = (Lc*Lc - Lp*Lp + Lpc*Lpc)/(2*Lpc)$$

$$Lv = (Lc*Lc - p*p)^0.5$$

In step S85, the CPU 10 determines the "position" and the "direction" of the second type sub node in the virtual space. The "position" (Jnc.pos) of the second type sub node in the virtual space is calculated by, for example, the following program code.

$$Jnc.pos = \text{Child}(Jnc).pos + p*pc/|pc| + Lv*v$$

For the "direction" (Jnc.rot) of the second type sub node in the virtual space, an appropriate direction is set in consideration of the "position" of the second type sub node, the "position" of the parent node or the child node, and the like.

In step S86, the CPU 10 finds whether or not all the second type sub nodes have already been selected (i.e., whether or not the "position" and the "direction" of all the second type sub nodes have already been determined). When all the second type sub nodes have already been selected, the CPU 10 finishes the second type sub node processing. When there is a second type sub node which has not been selected, the processing returns to step S80.

Owing to the above-described processing, the posture of the character object formed of a plurality of nodes is controlled to be natural based on the reference posture.

Especially when the positions or directions of a part of the main nodes in the virtual space are specified, the positions and directions of the remaining main nodes are calculated by the spring calculation processing based on the reference posture. Therefore, even without the parameters of each joint such as the movable range of the like being specifically set, the posture of the character object appears natural in the virtual space.

The position and direction of a sub node in the virtual space are determined based on the reference posture. Therefore, even without the parameters of each joint such as the movable range of the like being specifically set, the posture of the character is object appears natural in the virtual space.

The spring calculation processing is performed only on a part of the nodes (main nodes) among all the nodes forming the character object. Therefore, as compared with the case where the spring calculation processing is performed on all the nodes, the entire processing load can be reduced.

In this embodiment, an example of controlling the posture of a character object mimicking a human is described. The present invention is not limited to this, and is applicable to controlling the posture of any object formed of a plurality of nodes.

In this embodiment, an example of controlling the posture of a three-dimensional object located in the three-dimensional virtual space is described. The present invention is not limited to this, and is also applicable to controlling the posture of a two-dimensional object.

The present invention is not limited to a game in which the player interactively makes an operation on an object in the virtual space. Example embodiments of the present invention are also applicable to a game in which, for example, the player simply observes an object (e.g., dog, etc.) automatically moved in the virtual space by the computer. In this case, the input device is not absolutely necessary.

In this example embodiment, the present invention is applied to an installation type game device. Example embodiments of the present invention are applicable to any information processing device such as a mobile game device, a mobile phone, a general personal computer or the like.

In this embodiment, both of the position and direction of each node are controlled. Alternatively, either one of the position or direction may be fixed, and the other may be controlled.

Figure 38:
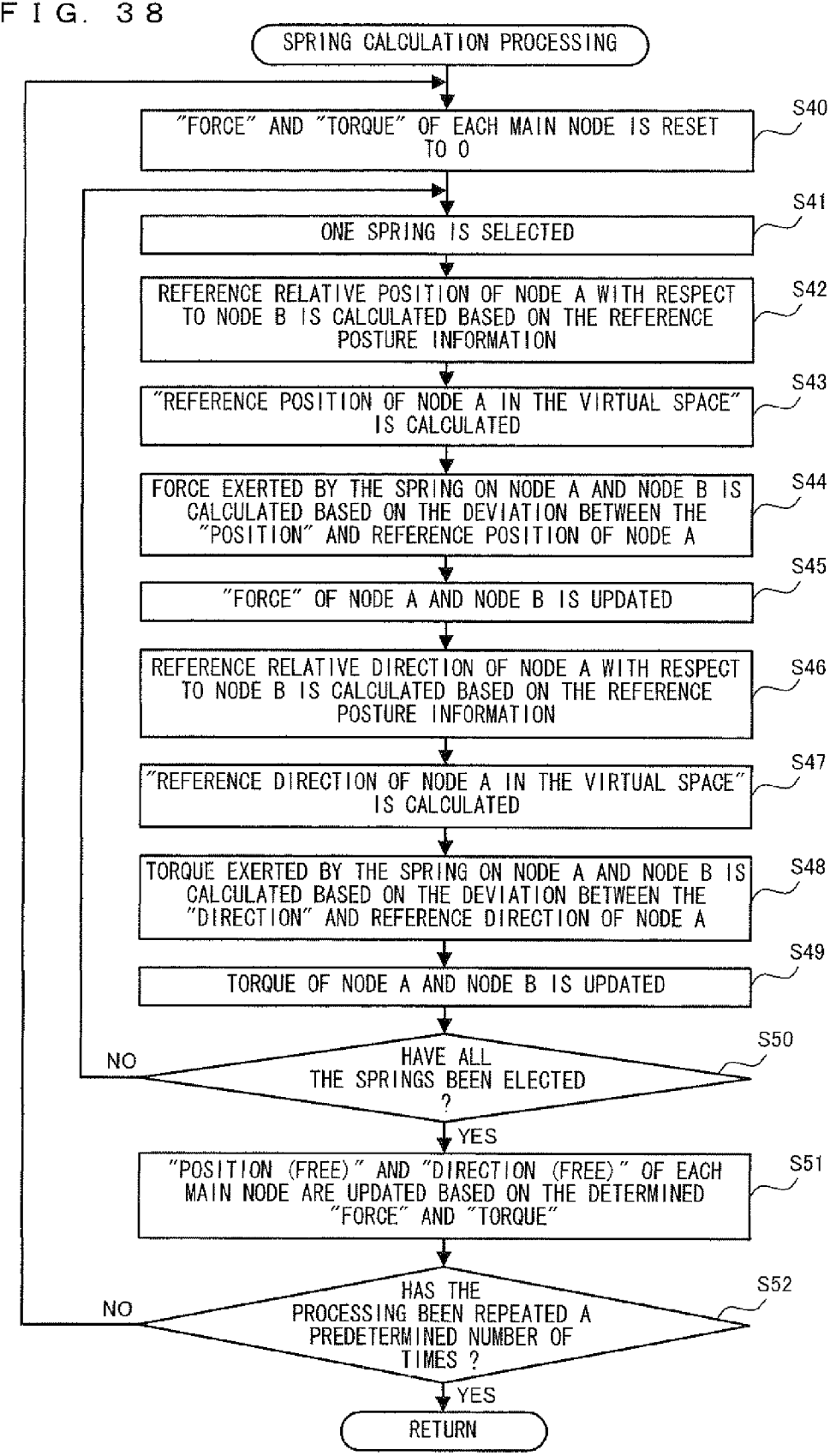
FIG. 38 is a flowchart showing the details of spring calculation processing.

In this embodiment, in the spring calculation processing, the series of processing in steps S40 through S51 in FIG. 38 is repeated a predetermined number of times. The present invention is not limited to this. The spring calculation processing may be finished without repeating the series of processing in steps S40 through S51 (i.e., after performing the series of processing only once).

Figure 39:
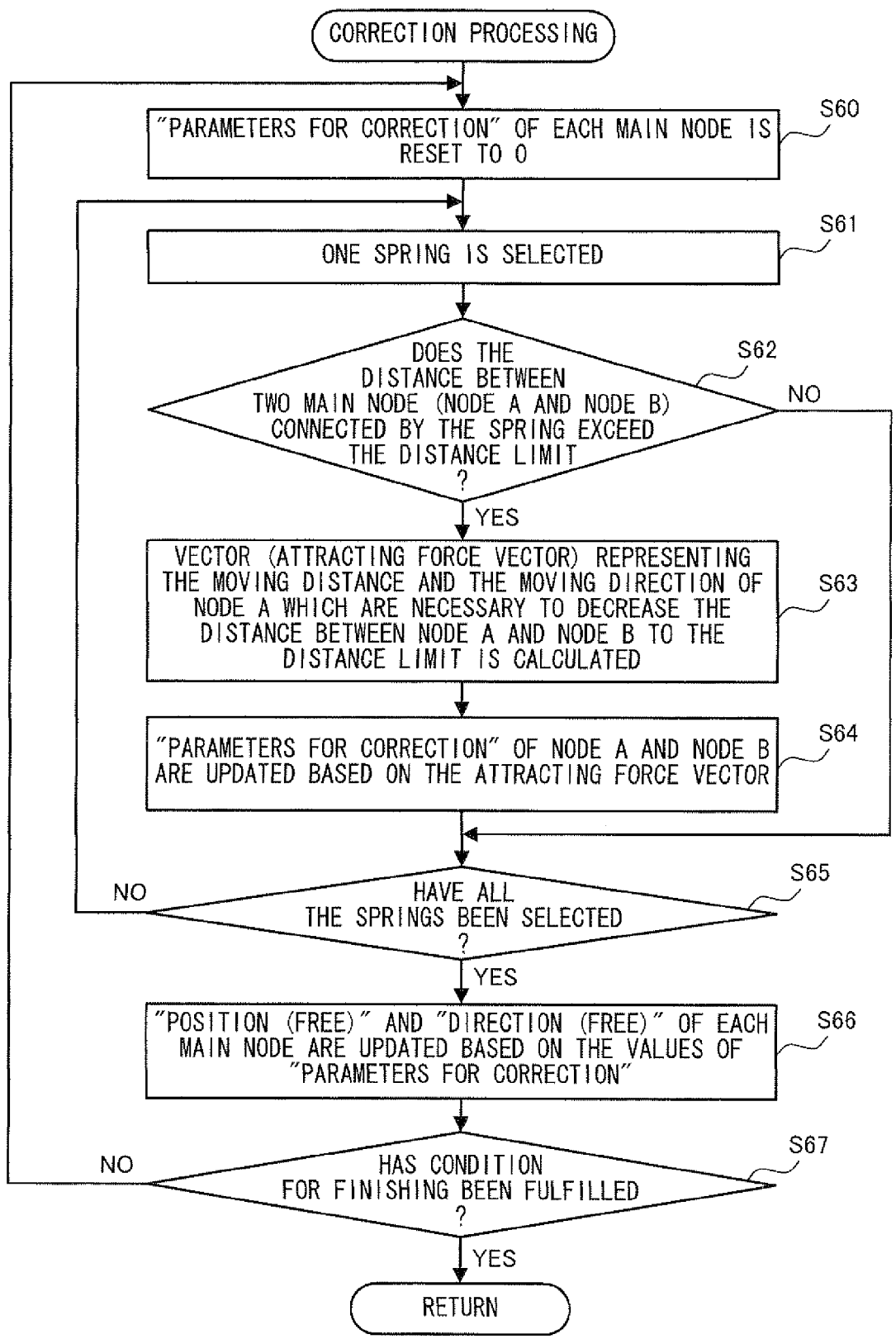
FIG. 39 is a flowchart showing the details of correction processing.
Figure 41:
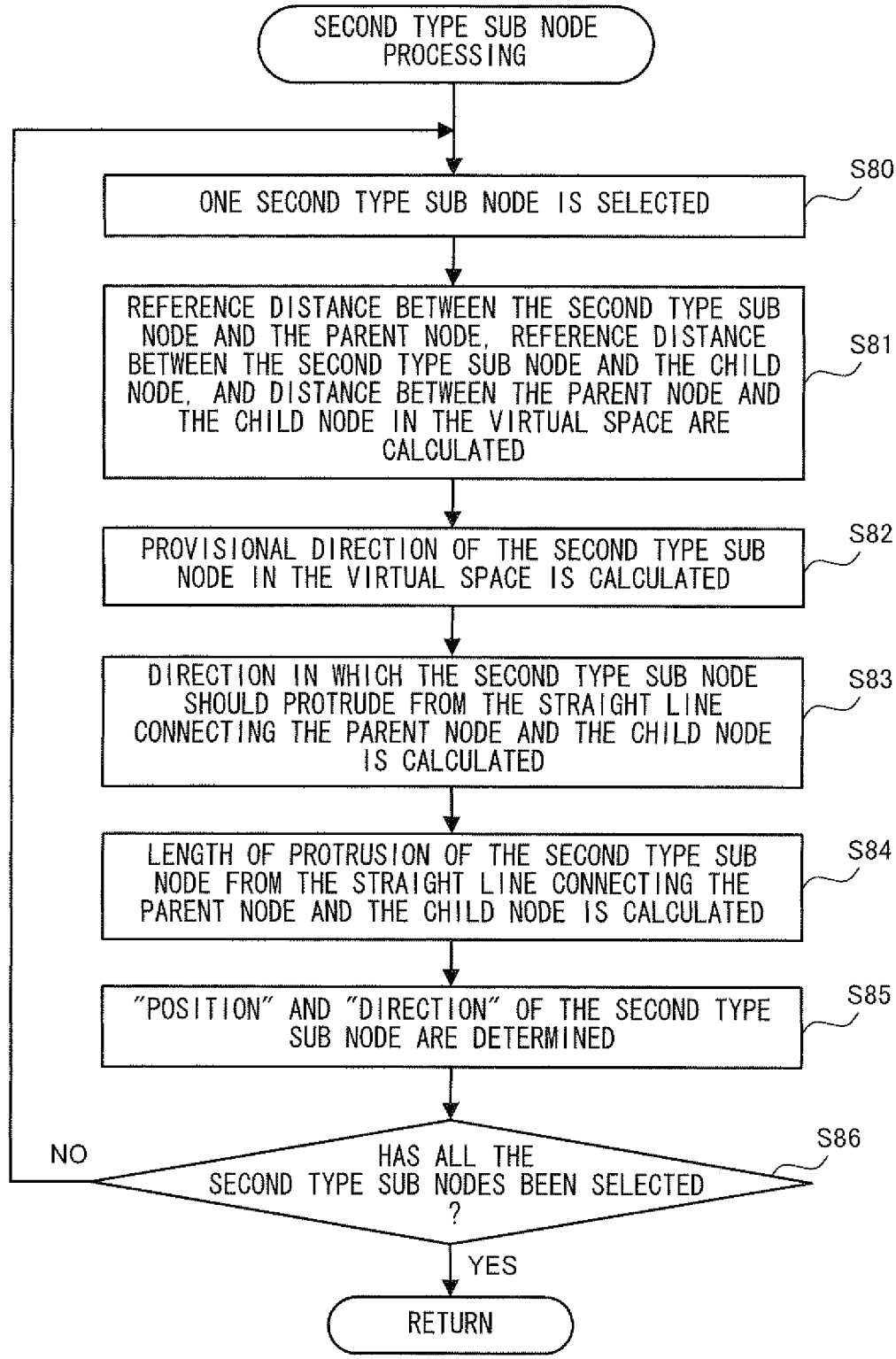
FIG. 41 is a flowchart showing the details of second type sub node processing.

In this embodiment, in the correction processing, the series of processing in steps S60 through S66 in FIG. 39 is repeated a predetermined number of times. The present invention is not limited to this. The correction processing may be finished without repeating the series of processing in steps S60 through S66 (i.e., after performing the series of processing only once).

In this embodiment, all the nodes forming the character object are classified into main node and sub nodes, and the position and direction are determined by different methods for the main node and the sub nodes. The present invention is not limited to this. Only the main node processing or the sub node processing may be executed on all the nodes to determine the position and direction of each node.

In this embodiment, the position and direction of the main nodes are determined by the spring calculation processing, and then corrected by the correction processing when necessary. The correction processing may be generally used as a correction technique for correcting the position and direction of a node determined by any technique.

While example embodiments of the invention have been described in detail, the foregoing description is in all aspects illustrative and not restrictive. It is understood that numerous other modifications and variations can be devised without departing from the scope of the invention.

What is claimed is:

1. A non-transitory computer readable storage medium having an information processing program stored thereon executable by a computer of an information processing apparatus for executing information processing for displaying an object, formed of a plurality of nodes connected to each other in a virtual space, on a display device, the information processing program causing the computer to provide functionality comprising:

an object motion in which the object is caused to make a predetermined motion;

an acting force calculation for calculating an attracting force or a repulsive force generated, in accordance with the predetermined motion, between a predetermined node serving as a node of attention among the plurality of nodes and each node serving as a connected node connected to the node of attention;

a maximum and minimum calculation for calculating a maximum value and a minimum value of a component, of each reference axis direction, of the attracting force or the repulsive force generated between the node of attention and each connected node;

a modification vector calculation for calculating a modification vector using the maximum value and the minimum value of each reference axis direction calculated by the maximum and minimum calculation;

a node control for controlling the node of attention based on the modification vector calculated by the modification vector calculation; and a display control for generating an image of the object which reflects the result of control by the node control and displaying the image on the display device.

2. A non-transitory computer readable storage medium according to claim 1, wherein:

the modification vector calculation includes a total value calculation for calculating a total value of each reference axis direction of the maximum value and the minimum value which are calculated by the maximum and minimum calculation for each reference axis direction; and the modification vector calculation calculates the modification vector using the total value of each reference axis direction calculated by the total value calculation.

3. A non-transitory computer readable storage medium according to claim 2, wherein the modification vector calculation uses the total value of each reference axis direction calculated by the total value calculation as a component of the modification vector of each reference axis direction.

4. A non-transitory computer readable storage medium according to claim 1, wherein:

the modification vector calculation includes a synthesized value calculation for calculating a synthesized value of each reference axis direction, the synthesized value being calculated by multiplying, by a predetermined coefficient, the total value of the maximum value and the minimum value calculated by the maximum and minimum calculation for each reference axis direction; and the modification vector calculation calculates the modification vector using the synthesized value of each reference axis direction calculated by the synthesized value calculation.

5. A non-transitory computer readable storage medium according to claim 4, wherein the modification vector calculation uses the synthesized value of each reference axis direction calculated by the synthesized value calculation as a component of the modification vector of each reference axis direction.

6. A non-transitory computer readable storage medium according to claim 1, wherein:

the acting force calculation includes an inter-node distance finding for finding whether or not an inter-node distance between the node of attention and the connected node is equal to or greater than a predetermined distance; and when the inter-node distance is found to be equal to or greater than the predetermined distance, the acting force calculation calculates an attracting force generated between the node of attention and the connected node in accordance with the predetermined motion.

7. A non-transitory computer readable storage medium according to claim 6, wherein the predetermined distance is preset for each pair of nodes connected to each other.

8. A non-transitory computer readable storage medium according to claim 6, wherein:

the information processing program causes the computer to provide further functionality comprising:

a difference calculation for calculating, for each of a plurality of preset pairs of nodes, a difference between the inter-node distance of the pair of nodes and the predetermined distance;

a difference total calculation for calculating a total of the differences of all the pairs of nodes calculated by the difference calculation; and a difference upper limit finding for finding whether or not the total of the differences of all the pairs of nodes calculated by the difference total calculation has exceeded a predetermined value; and while the difference upper limit finding finds that the total of the differences of all the pairs of nodes has exceeded the predetermined value, the information processing program causes the computer to execute a series of processing by the acting force calculation, the maximum and minimum calculation, the modification vector calculation, and the node control repeatedly; and the display control generates an image of the object which reflects the result of repetition of the series of processing, and displays the image on the display device.

9. A non-transitory computer readable storage medium according to claim 8, wherein while the difference upper limit finding finds that the total of the differences of all the pairs of nodes has exceeded the predetermined value, the information processing program causes the computer to execute the series of processing repeatedly with a predetermined upper limit number of times.

10. A non-transitory computer readable storage medium according to claim 1, wherein:

the information processing program causes the computer to provide further functionality comprising a node setting for setting a predetermined node among the plurality of nodes as the node of attention and setting each node connected to the node of attention as the connected node;

the information processing program causes the computer to execute a series of processing by the node setting, the acting force calculation, the maximum and minimum calculation, the modification vector calculation, and the node control repeatedly while sequentially changing the node of attention which is set by the node setting; and the display control generates an image of the object which reflects the result of repetition of the series of processing, and displays the image on the display device.

11. A non-transitory computer readable storage medium according to claim 1, wherein the object motion causes the object to make the predetermined motion by moving at least one node among the plurality of nodes.

12. An information processing apparatus for executing information processing for displaying an object, formed of a plurality of nodes connected to each other in a virtual space, on a display device, the information processing apparatus comprising:

an object motion unit configured to cause the object to make a predetermined motion;

an acting force calculation unit configured to calculate an attracting force or a repulsive force generated, in accordance with the predetermined motion, between a predetermined node serving as a node of attention among the plurality of nodes and each node serving as a connected node connected to the node of attention;

a maximum and minimum calculation unit configured to calculate a maximum value and a minimum value of a component, of each reference axis direction, of the attracting force or the repulsive force generated between the node of attention and each connected node;

a modification vector calculation unit configured to calculate a modification vector using the maximum value and the minimum value of each reference axis direction calculated by the maximum and minimum calculation unit;

a node control unit configured to control the node of attention based on the modification vector calculated by the modification vector calculation unit; and a display control unit configured to generate an image of the object which reflects the result of control by the node control unit and display the image on the display device.

13. An information processing system for executing information processing for displaying an object, formed of a plurality of nodes connected to each other in a virtual space, on a display device, the information processing system comprising:

a computer system, comprising a computer compressor, the computer system configured to:

cause the object to make a predetermined motion;

calculate an attracting force or a repulsive force generated, in accordance with the predetermined motion, between a first node among the plurality of nodes and each node connected to the first node;

calculate a maximum value and a minimum value of a component, of each reference axis direction, of the attracting force or the repulsive force generated between the first node and each connected node;

calculate a modification vector using the calculated maximum value and the minimum value of each reference axis direction;

control the first node based on the calculated modification vector; and generate an image of the object which reflects the result of the control and display the image on the display device.

14. The system according to claim 13, wherein the computer system is further configured to:

calculate a total value of each reference axis direction of the maximum value and the minimum value which are calculated for each reference axis direction; and calculate the modification vector using the total value of each calculated reference axis direction.

15. The system according to claim 13, wherein the computer system is further configured to:

calculate a synthesized value of each reference axis direction, the synthesized value being calculated by multiplying, by a predetermined coefficient, the total value of the calculated maximum value and the minimum value for each reference axis direction; and calculate the modification vector using the calculated synthesized value of each reference axis direction.

16. The system according to claim 13, wherein the computer system is further configured to:

find whether or not an inter-node distance between the first node and the connected node is equal to or greater than a predetermined distance; and when the inter-node distance is found to be equal to or greater than the predetermined distance, calculate an attracting force generated between the first node and the connected node in accordance with the predetermined motion.

17. The system according to claim 13, wherein the computer system is further configured to:

set a predetermined node among the plurality of nodes as the first node and set each node connected to the first node as the connected node;

execute a series of processing by the node setting, the acting force calculation, the maximum and minimum calculation, the modification vector calculation, and the node control repeatedly while sequentially changing the first node which is set by the node setting; and generate an image of the object which reflects the result of repetition of the series of processing, and display the image on the display device.

18. The system according to claim 13, wherein the computer system is further configured to cause the object to make the predetermined motion by moving at least one node among the plurality of nodes.

* * * * *